(12) United States Patent
Hanioka et al.

(10) Patent No.: US 11,329,593 B2
(45) Date of Patent: May 10, 2022

(54) POWER CONVERSION DEVICE AND ROTATING MACHINE DRIVE SYSTEM

(71) Applicant: Mitsubishi Electric Corporation, Chiyoda-ku (JP)

(72) Inventors: Shota Hanioka, Chiyoda-ku (JP); Masahiro Iezawa, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 38 days.

(21) Appl. No.: 16/966,949

(22) PCT Filed: Mar. 19, 2018

(86) PCT No.: PCT/JP2018/010731
§ 371 (c)(1),
(2) Date: Aug. 3, 2020

(87) PCT Pub. No.: WO2019/180763
PCT Pub. Date: Sep. 26, 2019

(65) Prior Publication Data
US 2020/0395881 A1    Dec. 17, 2020

(51) Int. Cl.
*H02P 27/08*    (2006.01)

(52) U.S. Cl.
CPC ................. *H02P 27/085* (2013.01)

(58) Field of Classification Search
CPC .................................................... H02P 27/085
See application file for complete search history.

(56) References Cited

U.S. PATENT DOCUMENTS

| | | | | |
|---|---|---|---|---|
| 5,317,248 A * | 5/1994 | Utley | ...................... | H02P 6/085 318/801 |
| 6,252,362 B1 * | 6/2001 | White | ...................... | H02P 6/10 318/400.2 |
| 6,580,236 B2 * | 6/2003 | Mitsuda | ...................... | H02P 6/10 318/400.17 |
| 8,773,051 B2 * | 7/2014 | Gokan | ................... | H02M 7/219 318/400.14 |
| 2006/0250728 A1 * | 11/2006 | Hussein | ............. | H02M 7/53875 361/18 |

(Continued)

FOREIGN PATENT DOCUMENTS

| | | |
|---|---|---|
| EP | 3 232 556 A1 | 10/2017 |
| JP | 2008-271617 A | 11/2008 |

(Continued)

OTHER PUBLICATIONS

Office Action dated Sep. 28, 2021 in Japanese Patent Application No. 2020-508107, 8 pages.

(Continued)

*Primary Examiner* — Rina I Duda
(74) *Attorney, Agent, or Firm* — Xsensus LLP

(57) ABSTRACT

Switching control of an inverter is performed such that rising and falling of a terminal voltage of U phase including upper and lower arm switching elements are calculated, and the calculated rising of the terminal voltage of U phase and falling of a terminal voltage of V phase or W phase or the calculated falling of the terminal voltage of U phase and rising of the terminal voltage of V phase or W phase are synchronized with each other.

14 Claims, 20 Drawing Sheets

(56) References Cited

U.S. PATENT DOCUMENTS

| | | | |
|---|---|---|---|
| 2009/0096502 A1* | 4/2009 | Miyamoto | H02M 1/38 |
| | | | 327/401 |
| 2010/0308761 A1* | 12/2010 | Wakabayashi | H02P 27/08 |
| | | | 318/400.17 |
| 2013/0015798 A1* | 1/2013 | Wright | H03K 7/08 |
| | | | 318/400.25 |
| 2014/0226381 A1* | 8/2014 | Sasaki | H02P 27/08 |
| | | | 363/97 |
| 2017/0302199 A1 | 10/2017 | Boulharts et al. | |
| 2018/0287544 A1 | 10/2018 | Kato et al. | |

FOREIGN PATENT DOCUMENTS

| | | |
|---|---|---|
| JP | 5045137 B2 | 10/2012 |
| JP | 5819010 B2 | 11/2015 |
| JP | 2016-208664 A | 12/2016 |
| WO | 2016/185924 A1 | 11/2016 |

OTHER PUBLICATIONS

International Search Report dated May 29, 2018 in PCT/JP2018/010731 filed Mar. 19, 2018, 2 pages.
Office Action dated Jun. 8, 2021, in corresponding Japanese patent Application No. 2020-508107, 3 pages.
Extended European Search Report dated Mar. 1, 2021 in European Patent Application No. 18910739.4, 9 pages.

\* cited by examiner

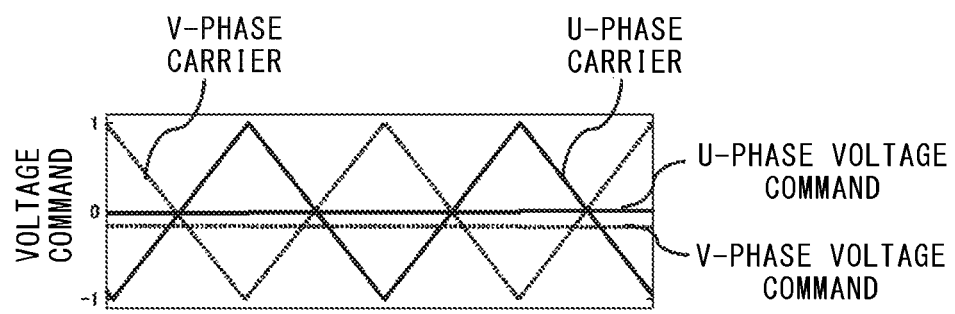
FIG.9A
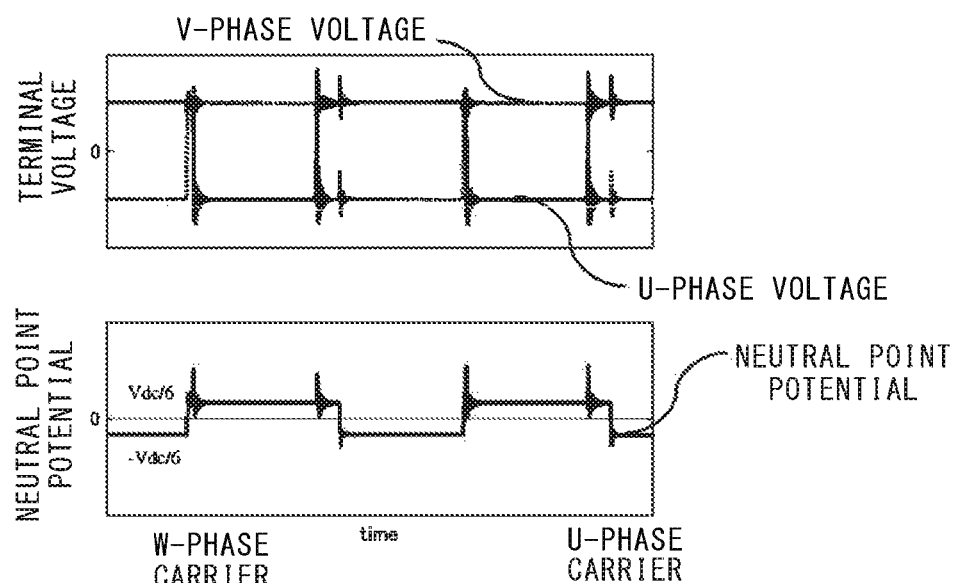
FIG.9B
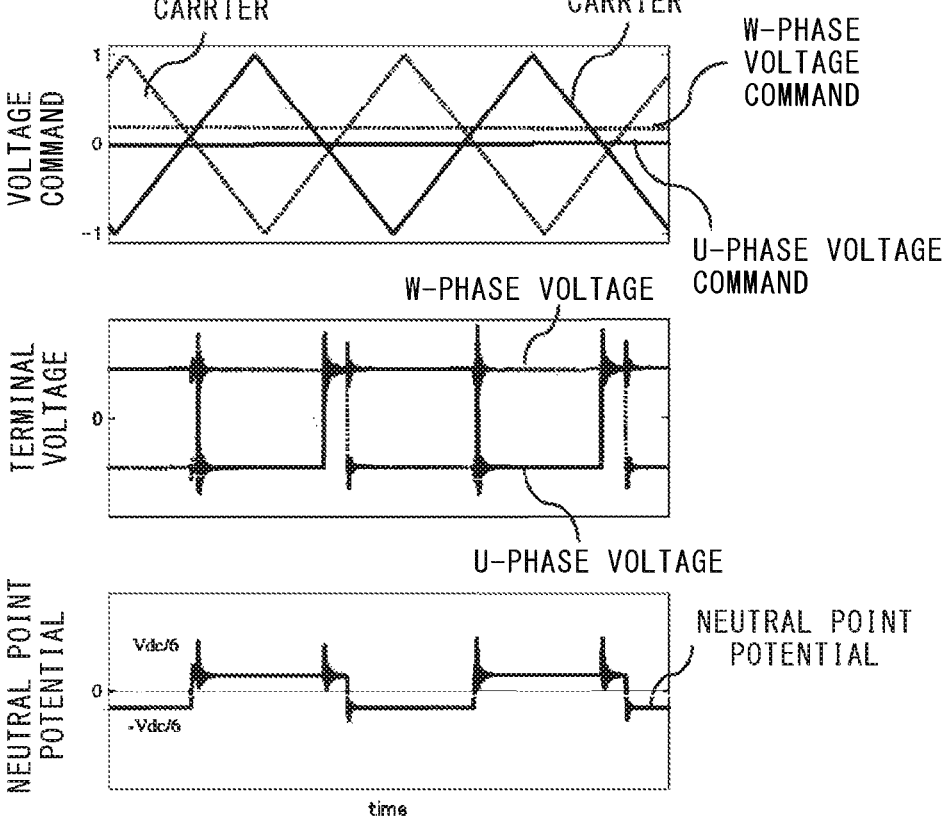

TIME T1  TIME T2

POWER CONVERSION DEVICE AND ROTATING MACHINE DRIVE SYSTEM

TECHNICAL FIELD

The present disclosure relates to a power conversion device and a rotating machine drive system.

BACKGROUND ART

In a converter that controls an output voltage by ON/OFF of switching elements, when each phase terminal voltage varies in switching operation, leakage current is generated via a stray capacitance with respect to the ground, and electromagnetic noise is generated.

Since electromagnetic noise standards are defined for each product category, measures need to be taken if the electromagnetic noise generated in a power converter exceeds regulations. In general, measures against electromagnetic noise are taken by a noise filter composed of a passive element. However, there are problems of securing a space occupied by the power converter and cost due to the filter.

Therefore, a technology to reduce electromagnetic noise by adjusting the phase of a carrier that determines ON/OFF of switching elements has been proposed in a conventional control device for a power converter (see, for example, Patent Document 1 and Patent Document 2).

CITATION LIST

Patent Document

Patent Document 1: Japanese Laid-Open Patent Publication No. 2008-271617 (page 7, lines 18 to 29, FIG. 5, FIG. 6)

Patent Document 2: Japanese Laid-Open Patent Publication No. 2016-208664 (page 6, lines 6 to 24, FIG. 3)

SUMMARY OF THE INVENTION

Problems to be Solved by the Invention

In a method described in Patent Document 1, by providing a phase difference in the carrier for each phase, the maximum value and the minimum value of the neutral point potential can be reduced, but the frequency of variation of the neutral point potential does not decrease. Thus, there is a problem that the effect of reducing electromagnetic noise is small.

Meanwhile, in a method described in Patent Document 2, by canceling terminal voltage variation between phases, the frequency of variation of the neutral point potential can be reduced, and thus the effect of reducing electromagnetic noise increases. However, the proposed method is effective only when a voltage command is substantially zero, and there is a problem that the effect of reducing electromagnetic noise decreases as a modulation factor increases.

The present disclosure has been made to solve the above-described problems, and an object of the present disclosure is to obtain a power conversion device capable of reducing electromagnetic noise under a wide range of driving conditions.

Solution to the Problems

A power conversion device according to the present disclosure is a power conversion device including: a power converter in which a plurality of one-phase legs each including an upper arm switching element and a lower arm switching element are connected in parallel to a DC power supply and connection points between the upper arm switching elements and the lower arm switching elements are connected to a load; and a control device for controlling switching operation of the upper arm switching elements and the lower arm switching elements of the power converter, the power conversion device converting DC power to AC power and supplying the AC power to the load, wherein the control device performs switching control such that, on the basis of a rising time and a falling time of a terminal voltage of a connection point, connected to the load, of a first one-phase leg, at least the rising time of the terminal voltage of the first one-phase leg and a falling time of a terminal voltage of a second one-phase leg or the falling time of the terminal voltage of the first one-phase leg and a rising time of the terminal voltage of the second one-phase leg are synchronized with each other.

Effect of the Invention

With the power conversion device according to the present disclosure, it is possible to synchronize terminal voltages at least between two phases under a wide range of driving conditions, and it is possible to reduce electromagnetic noise generated with neutral point potential variation.

BRIEF DESCRIPTION OF THE DRAWINGS

FIG. 9A shows terminal voltages and a neutral point potential of U phase and V phase according to Embodiment 1. FIG. 9B shows terminal voltages and a neutral point potential of U phase and W phase according to Embodiment 1.

DESCRIPTION OF EMBODIMENTS

Embodiment 1

Figure 1:
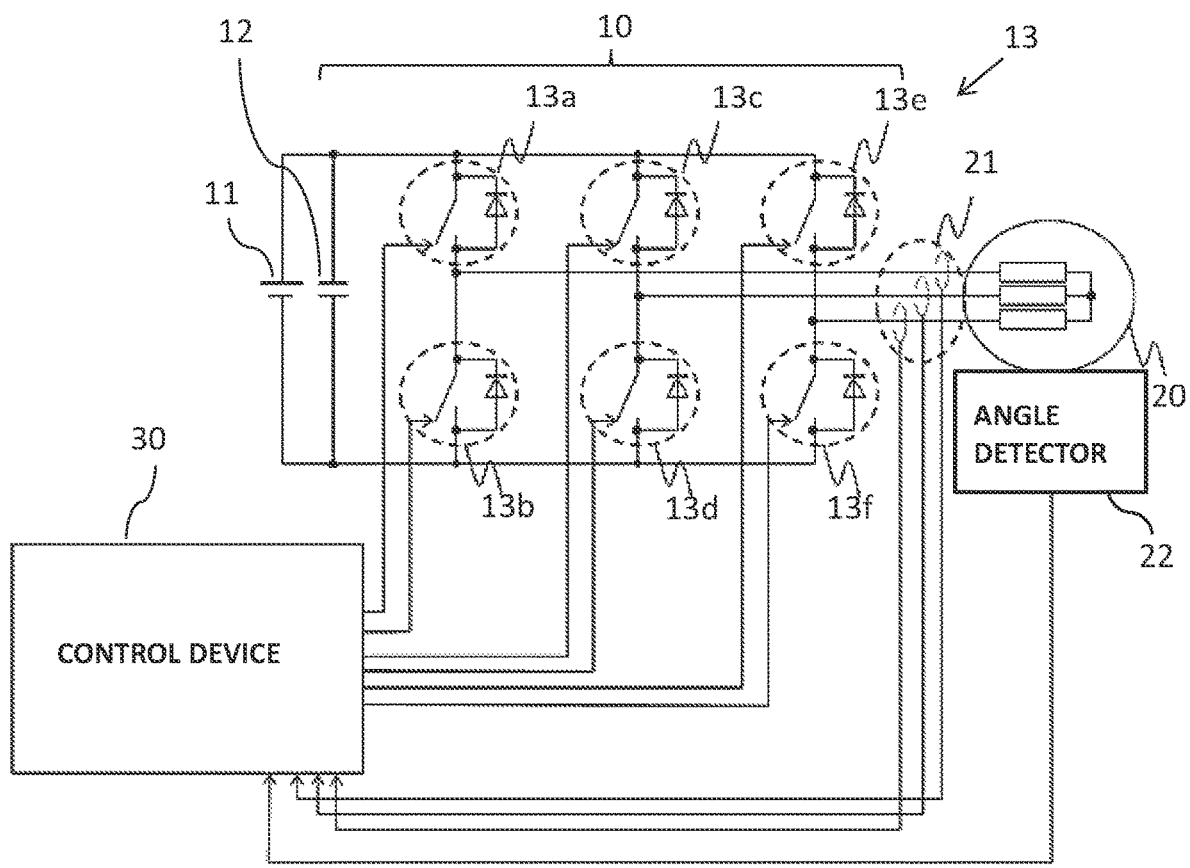
FIG. 1 shows the configuration of a control device for a power converter according to Embodiment 1.

FIG. 1 shows a control device for a power converter according to Embodiment 1. Embodiment 1 will be described with an example in which the control device is applied to a three-phase rotating machine drive system with a three-phase inverter.

In FIG. 1, the three-phase rotating machine drive system includes a power converter 10 that converts DC power to three-phase AC power, a rotating machine 20 that is supplied with power and driven by the power converter 10, and a control device 30 that controls the power converter 10.

A DC bus of the power converter 10 is connected to a DC power supply 11. The power converter 10 includes a smoothing capacitor 12 on the DC bus. The power converter 10 has switching elements 13 including a U-phase upper arm switch 13a, a U-phase lower arm switch 13b, a V-phase upper arm switch 13c, a V-phase lower arm switch 13d, a W-phase upper arm switch 13e, and a W-phase lower arm switch 13f. The upper and lower arm switches of each phase are connected in series. The upper and lower arm switches of the respective phases, which are connected in series, are connected in parallel to the DC bus and form a three-phase inverter. Each switching element 13 is composed of, for example, a MOSFET (metal-oxide-semiconductor field-effect transistor) or the like.

A U-phase output terminal of the rotating machine 20 is connected to the arm connection point between the U-phase upper arm switch 13a and the U-phase lower arm switch 13b, a V-phase output terminal of the rotating machine 20 is connected to the arm connection point between the V-phase upper arm switch 13c and the V-phase lower arm switch 13d, and a W-phase output terminal of the rotating machine 20 is connected to the arm connection point between the W-phase upper arm switch 13e and the W-phase lower arm switch 13f. The potential of the connection point, between the upper and lower arms of each phase, to which each phase terminal of the rotating machine 20 is connected is defined as a terminal voltage of each phase.

The rotating machine 20 includes a current detector 21 that detects a current of each phase, and an angle detector 22 that detects a rotor angle.

ON/OFF of the arm switches 13a to 13f of the respective phases is controlled on the basis of switching signals SW_UP, SW_UN, SW_VP, SW_VN, SW_WP, and SW_WN generated by the control device 30.

Figure 2:
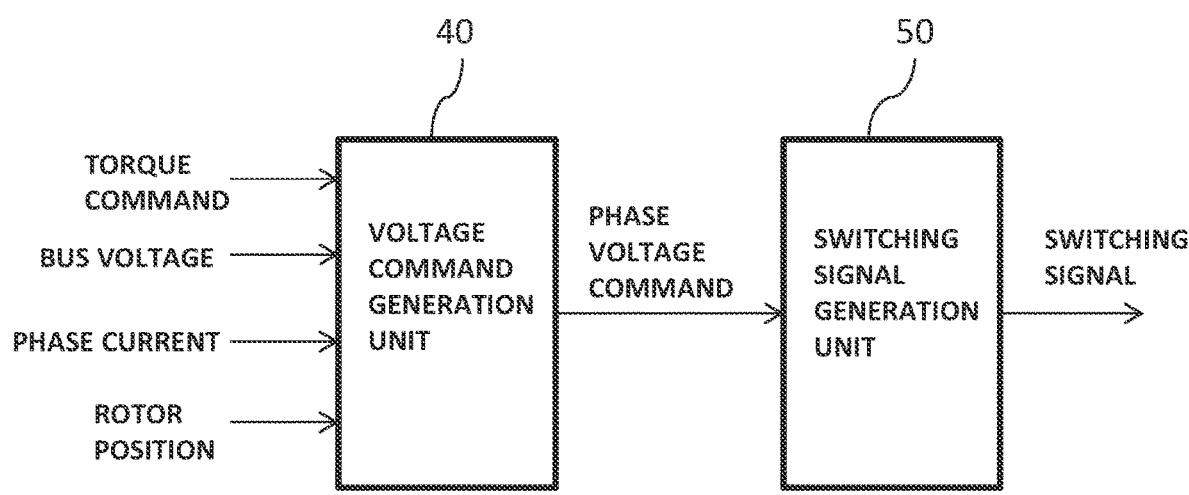
FIG. 2 is a function block diagram of the control device of Embodiment 1.

FIG. 2 shows a function block diagram of the control device 30 of Embodiment 1. The control device 30 includes a voltage command generation unit 40 and a switching signal generation unit 50. The voltage command generation unit 40 generates phase voltage commands vu*, vv*, and vw* for the respective phases that are calculated on the basis of an externally inputted torque command or current command, a bus voltage Vdc [V], three-phase current values iu [A], iv [A}, and iw [A] acquired by the current detector 21, and a rotor position θ acquired by the angle detector 22 and that are normalized by Vdc/2.

Figure 3:
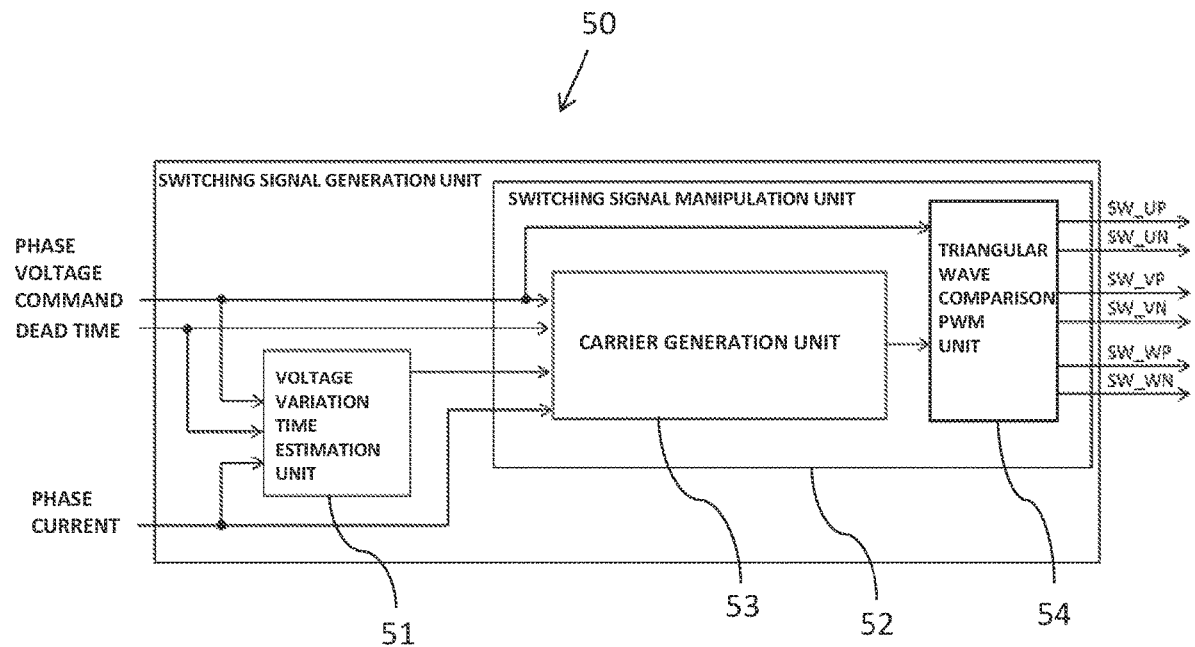
FIG. 3 is a function block diagram of a switching signal generation unit of Embodiment 1.

The switching signal generation unit 50 generates a switching signal on the basis of comparison between a phase voltage command and a triangular wave that is a carrier. Specifically, as shown in FIG. 3, the switching signal generation unit 50 includes a voltage variation time estimation unit 51 and a switching signal manipulation unit 52, and the switching signal manipulation unit 52 includes a carrier generation unit 53 and a triangular wave comparison PWM unit 54. In generation of switching signals by the triangular wave comparison PWM unit 54, switching signals for turning on the upper arm switch (P side) of each phase and turning off the lower arm switch (N side) of each phase when a voltage command is larger than a triangular wave and turning off the upper arm switch (P side) of each phase and turning on the lower arm switch (N side) of each phase when the voltage command is smaller than the triangular wave, are generated. At this time, to prevent the upper and lower arm switches from being turned on at the same time, when the P-side and N-side switches are turned on, an ON signal is generated with a delay of a dead time td. At the triangular wave comparison PWM unit 54, switching signals for synchronizing rising and falling of terminal voltages between two phases are generated by performing triangular wave comparison with different carriers for three phases.

Figure 4:
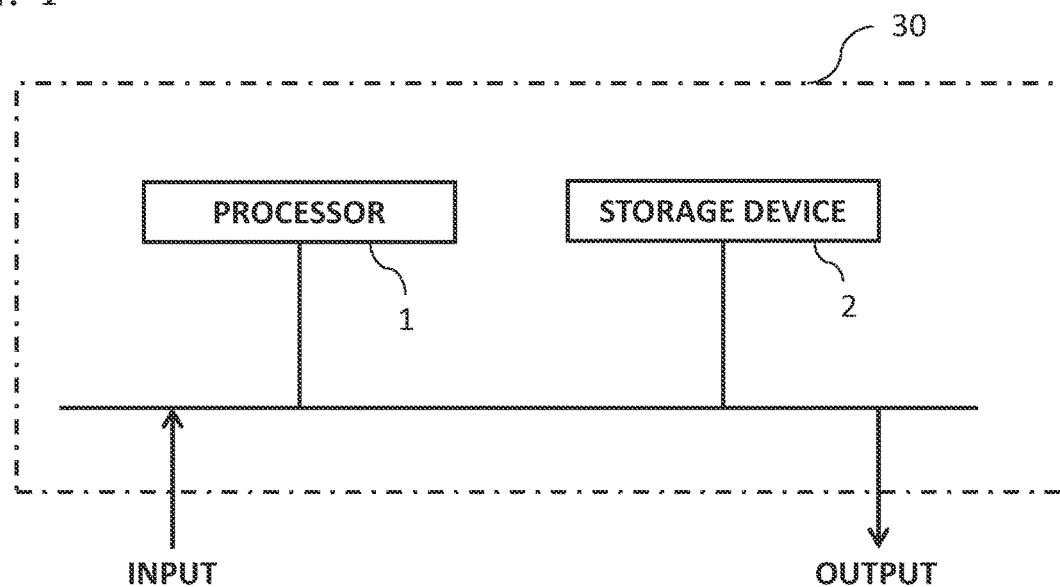
FIG. 4 shows an example of hardware of the control device of Embodiment 1.

FIG. 4 shows an example of hardware of the control device 30 having such a configuration. The control device 30 includes a processor 1 and a storage device 2. Although not shown, the storage device includes a volatile storage device such as a random access memory and a nonvolatile auxiliary storage device such as a flash memory. Alternatively, an auxiliary storage device that is a hard disk may be provided instead of the flash memory. The processor 1 executes a program inputted from the storage device 2, and implements a part or all of the configurations of the control device 30 described above. In this case, the program is inputted from the auxiliary storage device via the volatile storage device to the processor 1. In addition, the processor 1 may output data such as a calculation result to the volatile storage device of the storage device 2, or may store the data in the auxiliary storage device via the volatile storage device. Moreover, in addition to the processor 1 and the storage device 2, a logic circuit and an analog circuit may be used together.

Operation of the control device 30 until generation of switching signals for synchronizing rising and falling of terminal voltages between two phases will be described in detail below with reference to a flowchart of FIG. 5.

Figure 5:
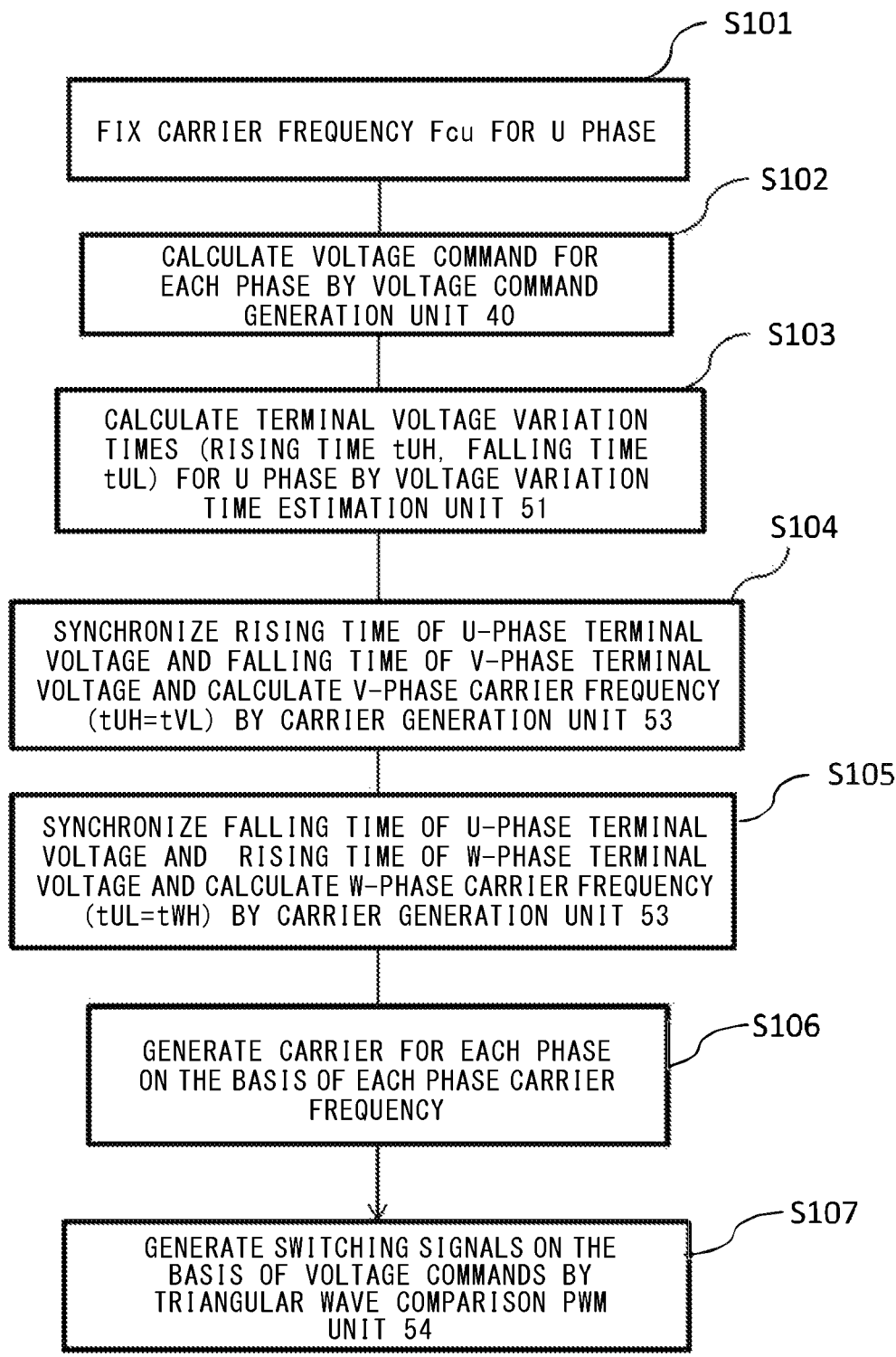
FIG. 5 is a flowchart showing operation of the switching signal generation unit of Embodiment 1.

As a premise, a carrier frequency Fcu [Hz] for U phase is fixed (step S101 in FIG. 5). Therefore, a U-phase carrier cycle Tcu [sec] is defined as Tcu=1/Fcu.

Figure 6:
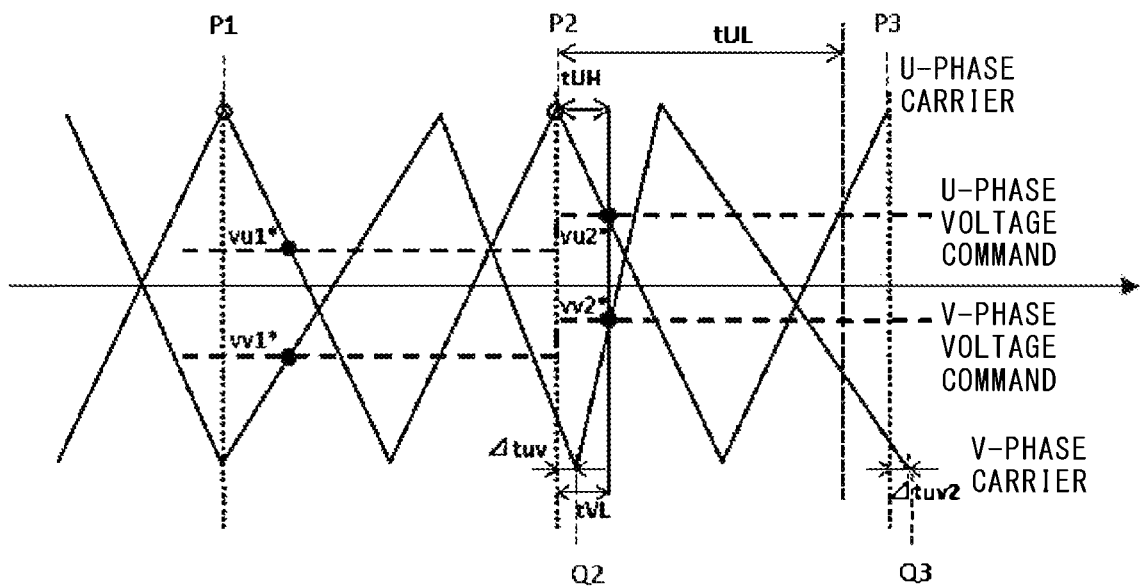
FIG. 6 is a conceptual diagram showing a method for calculating a V-phase carrier frequency according to Embodiment 1.

For example, in FIG. 6, the voltage command generation unit 40 calculates phase voltage commands at a top P1 of a U-phase carrier and updates each phase voltage command at the next top of the U-phase carrier (step S102). Here, phase voltage commands normalized by the present Vdc/2 are defined as vu1*, vv1*, and vw1*, respectively, and phase voltage commands with which update is performed at the next top P2 of the U-phase carrier and that are normalized by Vdc/2 in the next carrier cycle are defined as vu2*, vv2*, and vw2*, respectively. After calculation of each phase voltage command is completed, calculation of each phase carrier frequency is started.

At the voltage variation time estimation unit 51, terminal voltage variation times for U phase as a reference for cancellation are calculated. As shown in FIG. 6, with the time at the top P2 of the U-phase carrier being set as 0, a rising time tUH [sec] and a falling time tUL [sec] of a U-phase terminal voltage are defined.

The rising time tUH [sec] and the falling time tUL [sec] of the U-phase terminal voltage are variation times of the U-phase terminal voltage, and are calculated by Expression (1) and Expression (2) on the basis of the U-phase voltage command vu2* generated by the voltage command generation unit 40, and the U-phase carrier cycle Tcu [sec] which is a fixed value (step S103).

[Math. 1]

$$tUH = \frac{1-vu2*}{2} \cdot \frac{Tcu}{2} + Ku \cdot td \qquad (1)$$

[Math. 2]

$$tUL = \frac{Tcu}{2} + \frac{1+vu2*}{2} \cdot \frac{Tcu}{2} + (1-Ku)td \qquad (2)$$

where Ku=1 when U-phase terminal current iu>0, and Ku=0 when iu≤0.

Next, at the carrier generation unit 53, carrier frequencies at which rising and falling of terminal voltages of V phase and W phase are synchronized with those of U phase are calculated.

First, a frequency of a V-phase carrier is calculated (step S104). FIG. 6 shows a conceptual diagram showing the calculation method.

The frequency of the V-phase carrier is updated at tops of the U-phase carrier (P2, P3, etc., in FIG. 6). A rising frequency of the carrier is defined as Fcv_up [Hz], and a falling frequency of the carrier is defined as Fcv_dw [Hz].

A falling time tVL [Hz] of a V-phase terminal voltage is calculated by Expression (3) on the basis of the rising frequency Fcv_up [Hz], the V-phase voltage command vv2*, and a time difference Δtuv [sec] between the next top P2 of the U-phase carrier and a bottom Q2 of the V-phase carrier.

[Math. 3]

$$tVL = \Delta tuv + \frac{1+vv2*}{2} \cdot \frac{1}{2Fcv\_up} + (1-Kv)td \qquad (3)$$

where Kv=1 when V-phase terminal current iv>0, and Kv=0 when iv≤0.

If the rising time tUH [sec] of the U-phase terminal voltage and the falling time tVL [sec] of the V-phase terminal voltage are equal to each other, it is possible to synchronize rising and falling of the terminal voltages, and thus Expression (4) only needs to be satisfied.

[Math. 4]

$$tUH = tVL \qquad (4)$$

The rising frequency Fcv_up [Hz] of the V-phase carrier that satisfies Expression (4) on the basis of Expressions (1) and (3) is obtained by Expression (5).

[Math. 5]

$$Fcv\_up = \frac{1+vv2*}{(1-vv2*)Tcu - 4\Delta tuv + Kuv \cdot 4td} \qquad (5)$$

$$\text{where} \begin{cases} iu>0 \;\&\&\; iv>0 \Rightarrow Kuv=1 \\ iu<0 \;\&\&\; iv<0 \Rightarrow Kuv=-1 \\ \text{other cases} \Rightarrow Kuv=0 \end{cases}$$

Here, the method for calculating the time difference Δtuv [sec] will be described.

The time differences Δtuv [sec] and Δtuv2 [sec] are parameters for performing adjustment to prevent a time required for rising of the V-phase carrier from exceeding the U-phase carrier cycle Tcu [sec], and need to be set so as to satisfy Expression (6).

[Math. 6]

$$\frac{1}{2Fcv\_up\_min} + \Delta tuv < Tcu + \Delta tuv2 \Rightarrow \qquad (6)$$

$$\Delta tuv2 > \frac{1}{2Fcv\_up\_min} + \Delta tuv - Tcu$$

Here, Fcv_up_min [Hz] is the minimum value of the rising frequency of the V-phase carrier, corresponds to Fcv_up [Hz] when Kuv=−1 in Expression (5), and is calculated by Expression (7).

[Math. 7]

$$Fcv\_up\_min = \frac{1+vv2*}{(1-vu2*)Tcu - 4\Delta tuv - 4td} \qquad (7)$$

The time difference Δtuv2 [sec] that prevents the time required for rising of the V-phase carrier from exceeding the U-phase carrier cycle Tcu on the basis of Expression (6) and Expression (7) can be calculated by Expression (8).

[Math. 8]

$$\Delta tuv2 = \begin{cases} \frac{1}{2Fcv\_up\_min} + \Delta tuv - Tcu & \left(\frac{1}{2Fcv\_up\_min} + \Delta tuv - Tcu > 0\right) \\ 0 & \left(\frac{1}{2Fcv\_up\_min} + \Delta tuv - Tcu \leq 0\right) \end{cases} \quad (8)$$

Moreover, the falling frequency Fcv_dw [Hz] of the V-phase carrier only needs to be determined such that the time at a bottom Q3 of the V-phase carrier becomes Tcu+Δtuv2 with respect to the next top P3 of the U-phase carrier, and thus the falling frequency Fcv_dw [Hz] can be calculated by Expression (9).

[Math. 9]

$$\frac{1}{2Fcv\_up} + \frac{1}{2Fcv\_dw} - \Delta tuv = \quad (9)$$

$$Tcu + \Delta tuv2 \Rightarrow Fcv\_dw = \frac{1}{2} \frac{1}{Tcu - \Delta tuv + \Delta tuv2 - \frac{1}{2Fcv\_up}}$$

Next, a carrier frequency for W phase is calculated (step S105).

A rising frequency Fcw_up [Hz] and a falling frequency Fcw_dw [Hz] of a W-phase carrier will be described.

The carrier frequency for W phase is calculated separately for the case of synchronizing a bottom of the W-phase carrier and a top of the U-phase carrier with each other and for the case of synchronizing a top of the W-phase carrier and a bottom of the U-phase carrier with each other, in accordance with the values of voltage commands for U phase and W phase. The carrier frequency for W phase is updated at the tops and the bottoms of the W-phase carrier.

Figure 7:
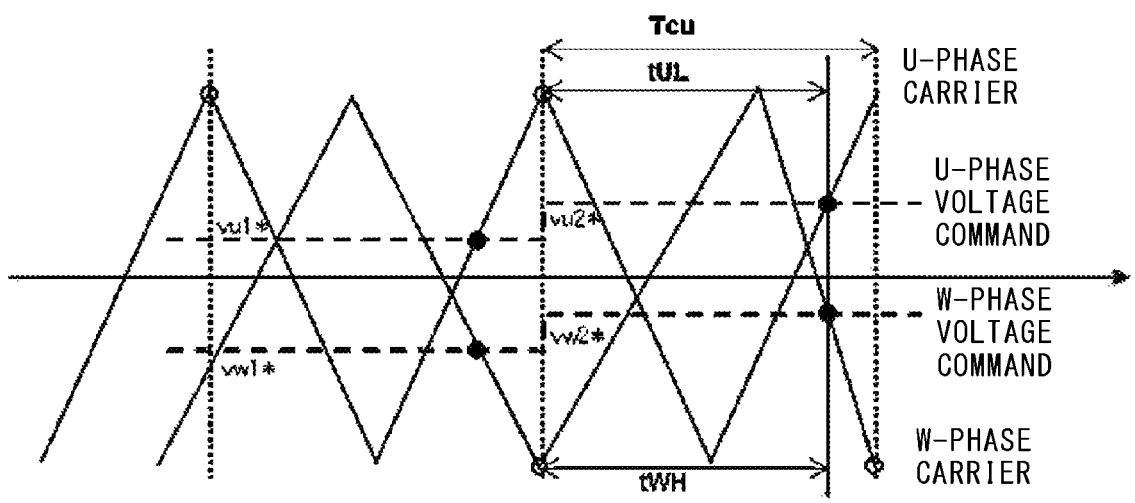
FIG. 7 is a conceptual diagram showing a method for calculating a W-phase carrier frequency according to Embodiment 1.

First, calculation for the case of synchronizing a bottom of the W-phase carrier and a top of the U-phase carrier with each other is started. FIG. 7 shows a conceptual diagram of the method for calculating the carrier frequency for W phase for the case of synchronizing a bottom of the W-phase carrier and a top of the U-phase carrier with each other.

At this time, a rising time tWH [sec] of a W-phase terminal voltage can be calculated by Expression (10).

[Math. 10]

$$tWH = Tcu - \frac{(1 + vw2*)}{2} \frac{1}{2Fcw\_dw} + Kw \cdot td \quad (10)$$

where Kw=1 when W-phase terminal current iw>0, and Kw=0 when iw≤0.

If the falling time tUL [sec] of the U-phase terminal voltage and the rising time tWH [sec] of the W-phase terminal voltage become equal to each other, it is possible to synchronize rising and falling of the terminal voltages, and thus Expression (11) only needs to be satisfied.

[Math. 11]

$$tUL = tWH \quad (11)$$

The falling frequency Fcw_dw [Hz] of the W-phase carrier that satisfies Expression (11) on the basis of Expression (2) and Expression (10) can be obtained by Expression (12).

[Math. 12]

$$Fcw\_dw = \frac{1 + vu2*}{(1 + vu2*)Tcu + Kuw \cdot 4td} \quad (12)$$

$$\text{where} \begin{cases} iu > 0 \,\&\&\, iw > 0 \Rightarrow Kuw = 1 \\ iu < 0 \,\&\&\, iw < 0 \Rightarrow Kuw = -1 \\ \text{other cases} \Rightarrow Kuw = 0 \end{cases}$$

The rising frequency Fcw_up [Hz] of the W-phase carrier is calculated by Expression (13) such that the carrier cycle of the W-phase carrier is equal to that of the U-phase carrier.

[Math. 13]

$$Tcu = \frac{1}{2Fcw\_up} + \frac{1}{2Fcw\_dw} \Rightarrow Fcw\_up = \frac{1}{2} \frac{1}{Tcu - \frac{1}{2Fcw\_dw}} \quad (13)$$

Figure 8:
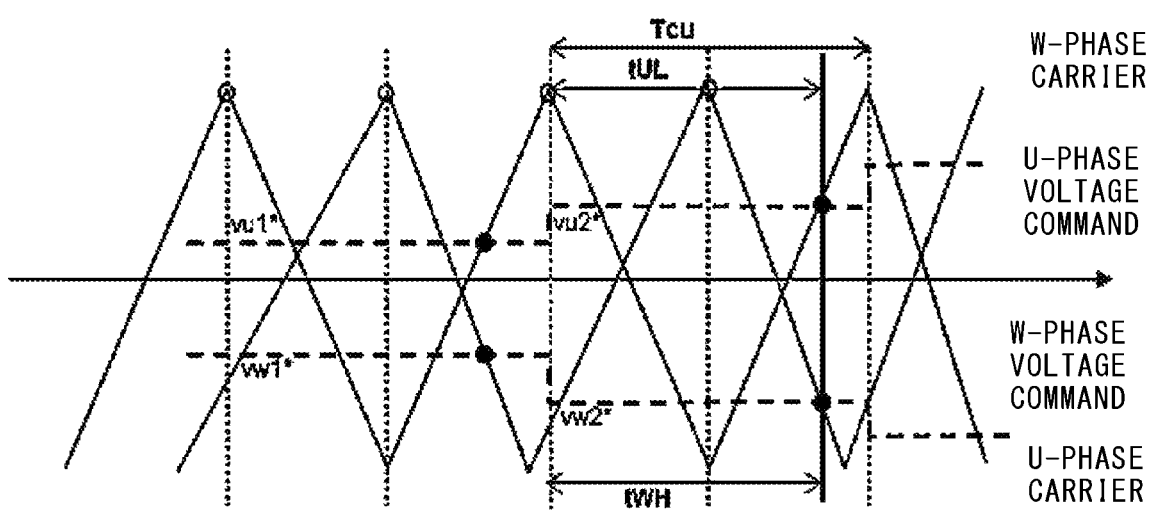
FIG. 8 is another conceptual diagram showing the method for calculating a W-phase carrier frequency according to Embodiment 1.

Next, a condition for synchronizing a top of the W-phase carrier with a bottom of the U-phase carrier will be described. FIG. 8 shows a conceptual diagram of the W-phase carrier frequency calculating method in this case.

When Fcw_dw<Fcu/2 in Expression (12), a bottom of the W-phase carrier cannot be synchronized with a top of the U-phase carrier, and thus a transition is made to the case of synchronizing a top of the W-phase carrier and a bottom of the U-phase carrier with each other. In the transition, the rising frequency Fcw_up [Hz] of the W-phase carrier is provided by Expression (14), and a top of the W-phase carrier is synchronized with a bottom of the U-phase carrier.

[Math. 14]

$$Fcw\_up = Fcu \quad (14)$$

The next falling frequency Fcw_dw [Hz] of the W-phase carrier and the rising frequency Fcw_up2 [Hz] of the W-phase carrier after the said next falling frequency are calculated.

Under the condition for synchronizing a top of the W-phase carrier with a bottom of the U-phase carrier, the rising time tWH [sec] of the W-phase terminal voltage can be calculated by Expression (15).

[Math. 15]

$$tWH = \frac{Tcu}{2} + \frac{1 - vw2*}{2} \frac{1}{2Fcw\_dw} + Kw \cdot td \quad (15)$$

The falling frequency Fcw_dw [Hz] of the W-phase carrier that satisfies Expression (11) on the basis of Expression (2) and Expression (15) can be calculated by Expression (16).

[Math. 16]

$$Fcw\_dw = \frac{1 - vw2*}{(1 + vu2*)Tcu - Kuw \cdot 4td} \quad (16)$$

In addition, the rising frequency Fcw_up2 [Hz] of the W-phase carrier after the said next falling frequency is calculated by Expression (17) such that the cycle of the W-phase carrier is equal to that of the U-phase carrier.

[Math. 17]

$$Tcu = \frac{1}{2Fcw\_up2} + \frac{1}{2Fcw\_dw} \Rightarrow Fcw\_up2 = \frac{1}{2}\frac{1}{Tcu - \frac{1}{2Fcw\_dw}} \quad (17)$$

When Fcw_dw<Fcu in Expression (16), a transition is made to the condition for synchronizing a bottom of the W-phase carrier and a top of the U-phase carrier with each other.

The carrier generation unit 53 generates carriers CarrU, CarrV, and CarrW for the respective phases on the basis of: the U-phase carrier frequency Fcu [Hz]; and the rising frequency Fcv_up [Hz] and the falling frequency Fcv_dw [Hz] of the V-phase carrier, and the rising frequencies Fcw_up [Hz] and Fcw_up2 [Hz] and the falling frequency Fcw_dw [Hz] of the W phase carrier, all of which are calculated on the basis of Expression (1) to Expression (17) (step S106).

Specifically, the U-phase carrier CarrU is generated as a triangular wave that rises and falls at ½Fcu. The V-phase carrier CarrV is generated as a triangular wave that rises at ½Fcv_up and that falls at ½Fcv_dw. The W-phase carrier is generated as a triangular wave that rises at ½Fcw_up or ½Fcw_up2 and that falls at ½Fcw_dw.

The triangular wave comparison PWM unit 54 generates switching signals for the upper and lower arms of each phase on the basis of each phase carrier generated by the carrier generation unit 53 and the voltage commands generated by the voltage command generation unit 40 through such calculation (step S107).

Figure 10A:
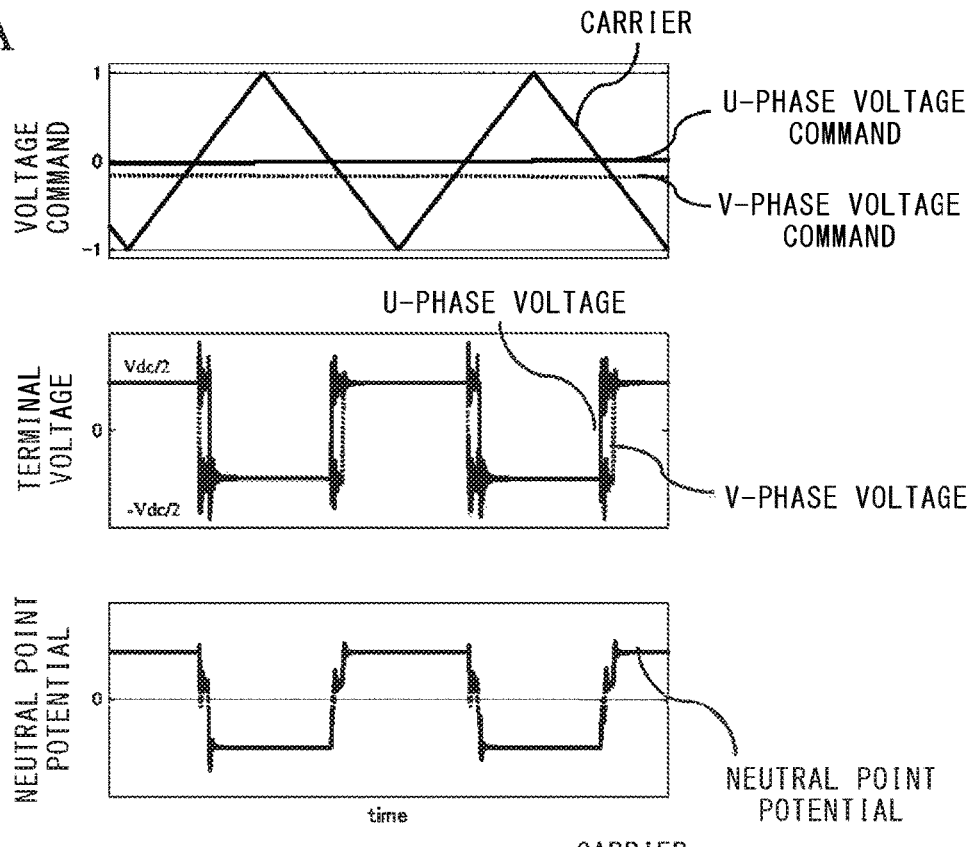
FIG. 10A shows terminal voltages and a neutral point potential of U phase and V phase by conventional triangular wave comparison PWM
Figure 10B:
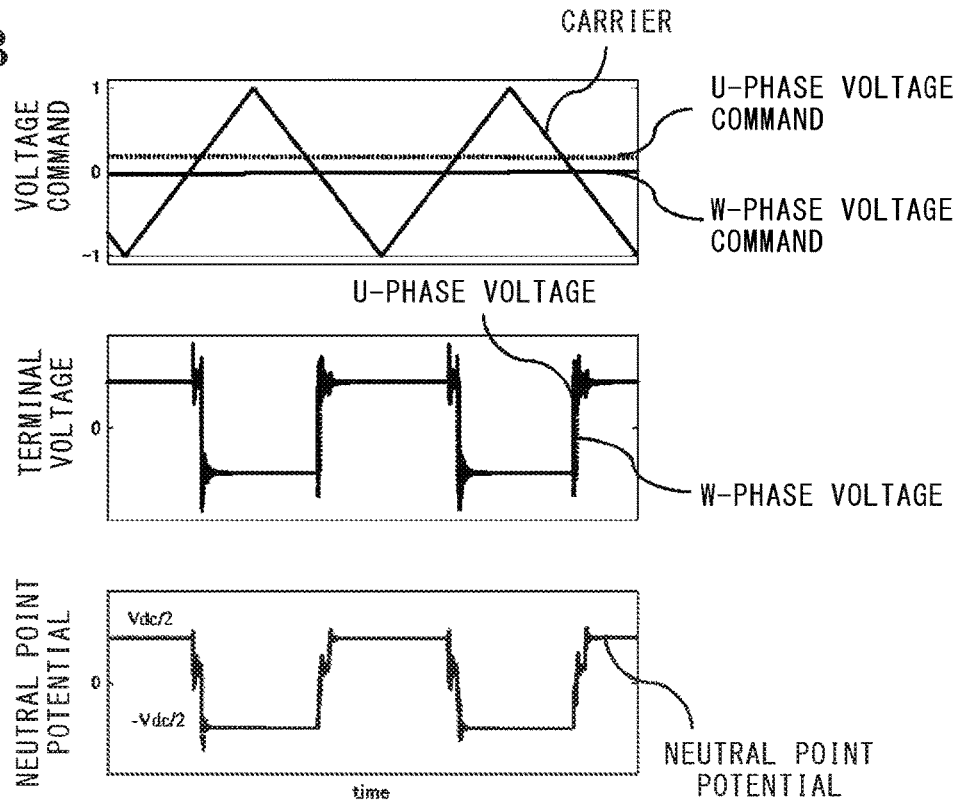
FIG. 10B shows terminal voltages and a neutral point potential of U phase and W phase by the conventional triangular wave comparison PWM.

FIG. 9A shows measurement results of terminal voltages and a neutral point potential of U phase and V phase measured with such a configuration, and FIG. 9B shows measurement results of terminal voltages and a neutral point potential of U phase and W phase measured with such a configuration. For comparison, FIG. 10A shows measurement results of terminal voltages and a neutral point potential of U phase and V phase in the case of conventional art in which three-phase carriers are the same, and FIG. 10B shows measurement results of terminal voltages and a neutral point potential of U phase and W phase in the case where three-phase carriers are the same. It is found that, as compared to conventional switching by triangular wave comparison PWM in the case where three-phase carriers are the same, in switching according to the present embodiment, the falling times and the rising times of terminal voltages between two phases are synchronized, and the neutral point potential is reduced.

Figure 14A:
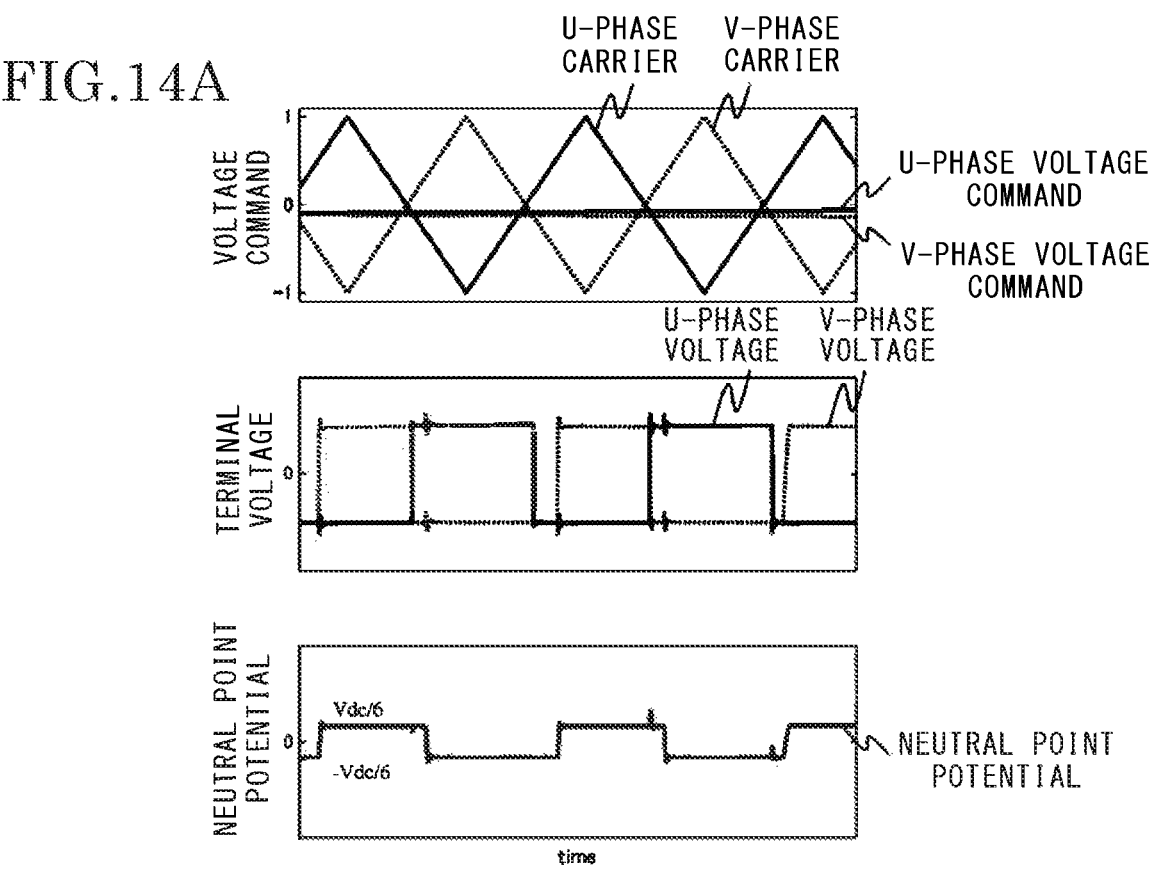
FIG. 14A shows terminal voltages and a neutral point potential of U phase and V phase after switching signal manipulation in Embodiment 2.
Figure 14B:
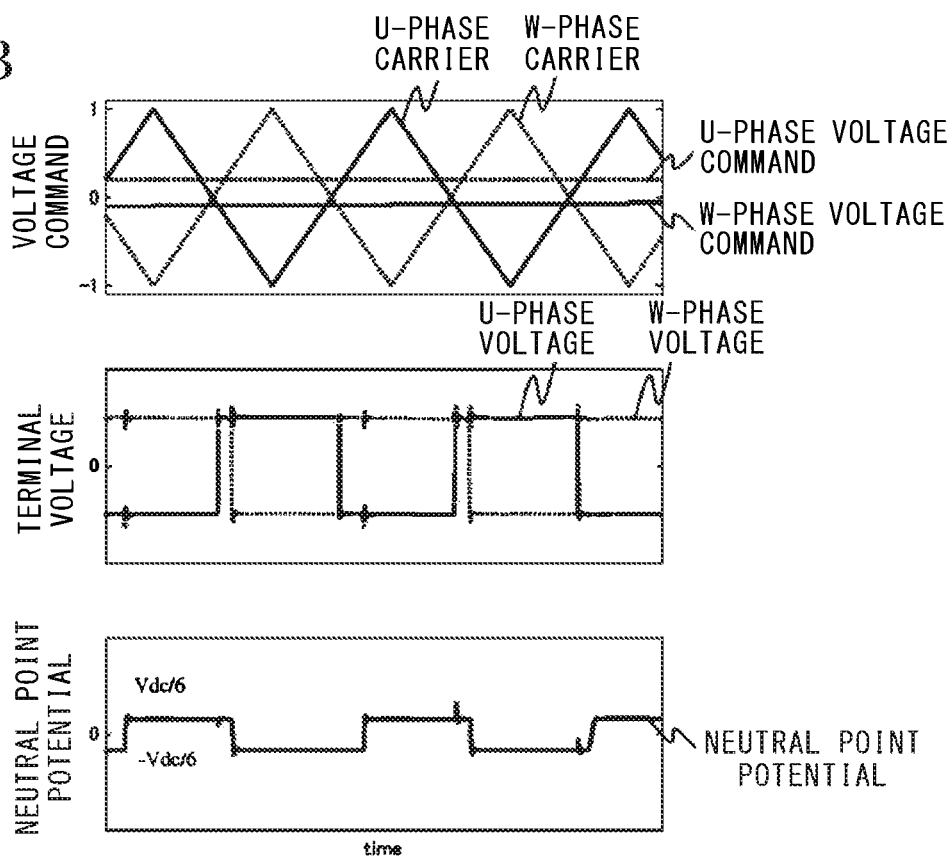
FIG. 14B shows terminal voltages and a neutral point potential of U phase and W phase after switching signal manipulation in Embodiment 2.

Furthermore, FIGS. 14A and 14B show measurement results obtained using the method described in Patent Document 2. It is also found that the neutral point potential variation is reduced as compared to the neutral point potential of U phase and V phase (see FIG. 11A) and the neutral point potential of U phase and W phase (see FIG. 11B).

As presented above, in Embodiment 1, the example in which rising of the terminal voltage of U phase is synchronized with falling of the terminal voltage of V phase and falling of the terminal voltage of U phase is synchronized with rising of the terminal voltage of W phase has been described. However, rising of the terminal voltage of U phase may be synchronized with falling of the terminal voltage of W phase, and falling of the terminal voltage of U phase may be synchronized with rising of the terminal voltage of V phase. Alternatively, the phase to be cancelled may be changed to a phase other than U phase.

Moreover, the example in which the carrier frequency is manipulated has been described, but the same effects are also achieved by manipulating each phase voltage command value.

Furthermore, in Embodiment 1, the example in which the voltage commands are updated at a top of the U-phase carrier every carrier cycle has been described, but the voltage commands may be updated at a bottom of the U-phase carrier, or may be updated every two or more carrier cycles.

With such a configuration, in the control device which generates switching signals for the upper and lower arms of each phase by triangular wave comparison PWM, regardless of a modulation factor, carriers capable of synchronizing rising and falling of terminal voltages at least between two phases can be generated under a wide range of driving conditions in which voltage commands are not zero, so that it is possible to reduce neutral point potential variation. Accordingly, it is possible to reduce electromagnetic noise generated with potential variation. Furthermore, since it is possible to reduce electromagnetic noise, it is also possible to reduce the size of a noise filter.

Embodiment 2

In Embodiment 2, an example in which terminal voltage variation is synchronized between phases to reduce neutral point potential variation by manipulating switching signals after triangular wave comparison PWM, will be described.

As a method for synchronizing terminal voltage variation of each phase having different polarities by manipulating switching signals after triangular wave comparison PWM, the following two methods are assumed:

(1) a method of manipulating switching signals in the next cycle on the basis of voltage commands in the next cycle; and (2) a method of detecting rising and falling of present switching signals generated and time-shifting the signals until a switching signal time to be synchronized is detected. However, an example in which the method (1) is applied will be described.

Figure 12:
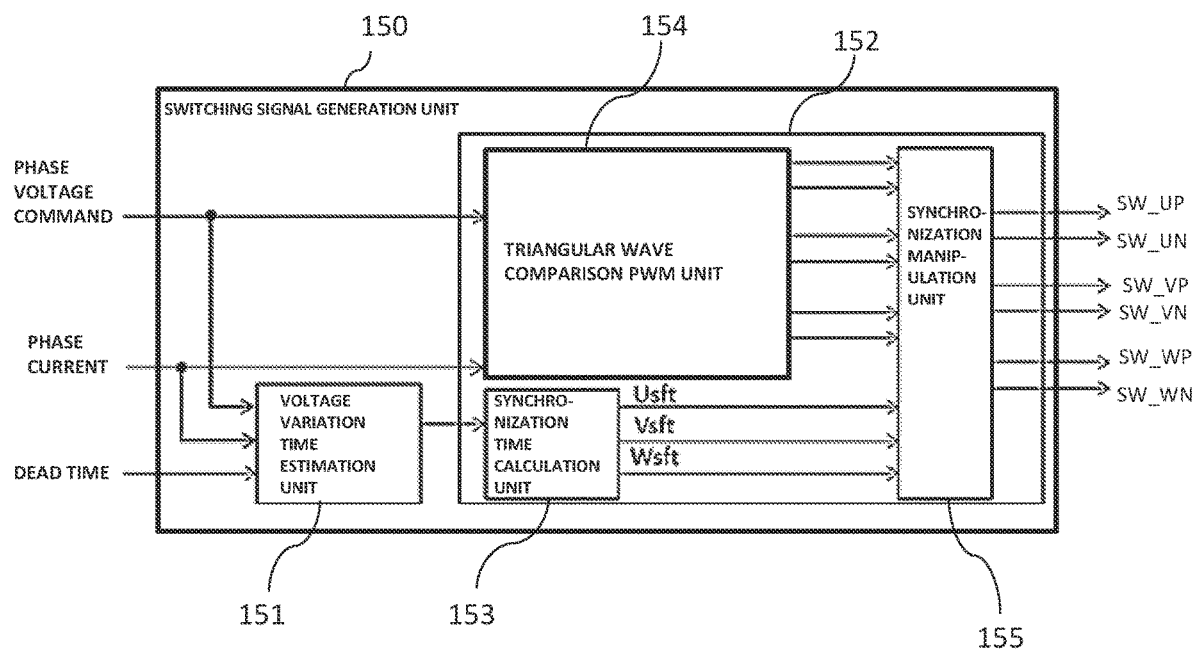
FIG. 12 is a function block diagram of a switching signal generation unit of Embodiment 2.

FIG. 12 shows a function block diagram of a switching signal generation unit 150 in Embodiment 2.

The configurations of a power converter 10, a rotating machine 20, and a voltage command generation unit 40 in a control device 30 are the same as those of Embodiment 1. The hardware configuration is also the same as that shown in FIG. 4.

The switching signal generation unit 150 in the control device 30 includes a voltage variation time estimation unit 151 and a switching signal manipulation unit 152, and the switching signal manipulation unit 152 includes a synchronization time calculation unit 153, a triangular wave comparison PWM unit 154, and a synchronization manipulation unit 155.

Figure 13:
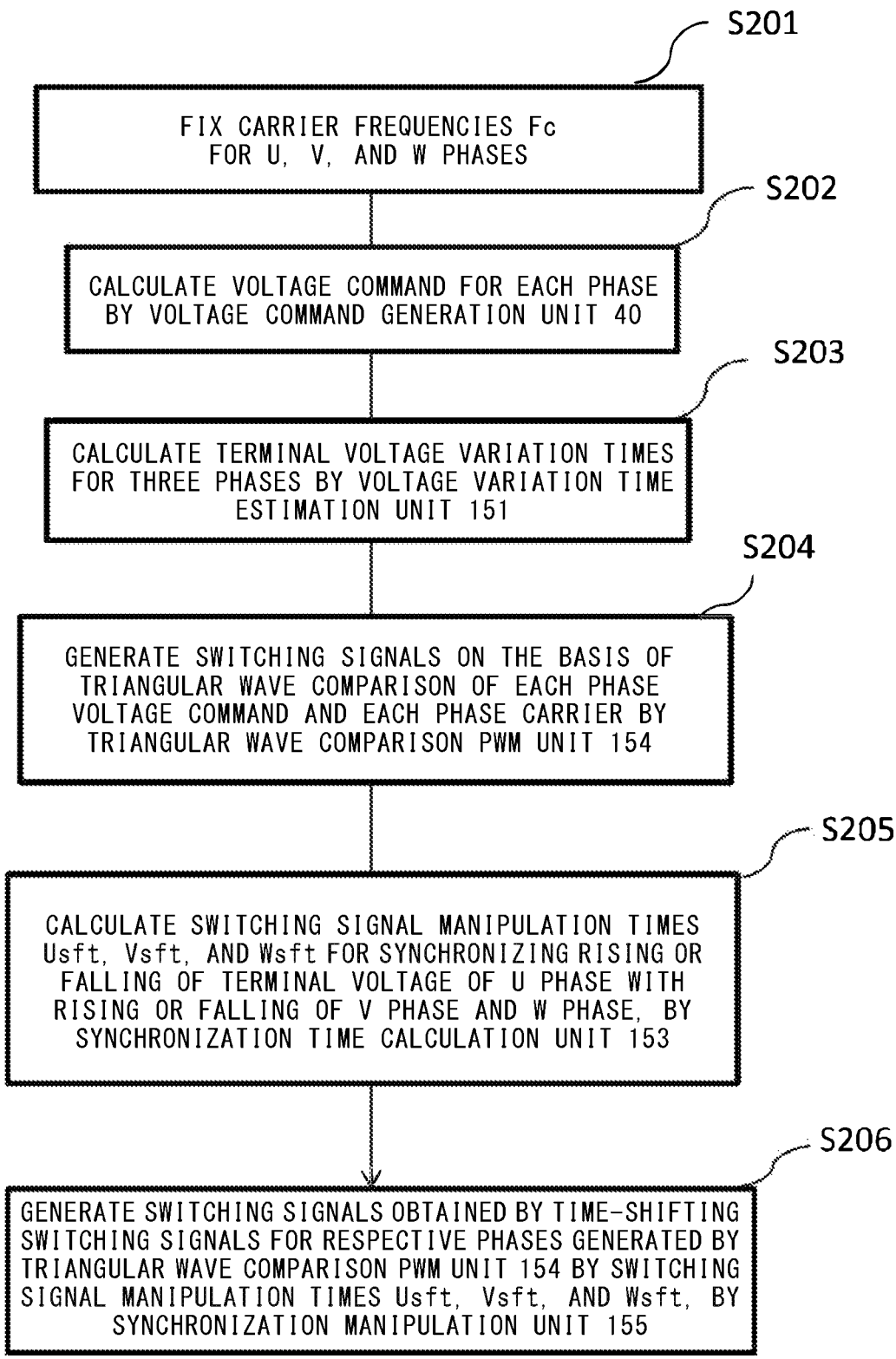
FIG. 13 is a flowchart showing operation of the switching signal generation unit of Embodiment 2.

Next, operation of the switching signal generation unit 150 of Embodiment 2 will be sequentially described with reference to a flowchart of FIG. 13.

First, at the voltage variation time estimation unit 151, rising times and falling times tUH [sec], tUL [sec], tVH [sec], tVL [sec], tWH [sec], and tWL [sec] that are terminal voltage variation times for the respective phases from a top of a U-phase carrier are calculated on the basis of phase voltage commands vu*, vv*, and vw* normalized by Vdc/2, a dead time td [sec], and phase currents iu[A], iv[A], and iw[A].

In Embodiment 2, similar to Embodiment 1, rising and falling of a U-phase terminal voltage are synchronized with either rising or falling of V-phase and W-phase terminal voltages. In addition, carrier frequencies Fc [Hz] for the three phases are fixed (step S201 in FIG. 13). Each carrier cycle is defined as Tc (=1/Fc).

Similar to Embodiment 1, an example in which the V-phase and W-phase carriers are inverted with respect to the U-phase carrier will be described. The voltage command generation unit 40 calculates each phase voltage command at a top of the U-phase carrier, and updates each phase voltage command at the next top of the U-phase carrier. Here, phase voltage commands normalized by the present Vdc/2 are defined as vu1*, vv1*, and vw1*, respectively, and phase voltage commands with which update is performed at the next top of the U-phase carrier and that are normalized by Vdc/2 in the next carrier cycle are defined as vu2*, vv2*, and vw2*, respectively.

After calculation of the respective phase voltage commands vu2*, vv2*, and vw2* (step S202), terminal voltage variation times for three phases are calculated at the voltage variation time estimation unit 151 (step S203). With the time at the next top of the U-phase carrier being set as time 0, the rising time tUH [sec] and the falling time tUL [sec] of the U-phase terminal voltage, the rising time tVH [sec] and the falling time tVL [sec] of the V-phase terminal voltage, and the rising time tWH [sec] and the falling time tWL [sec] of the W-phase terminal voltage are defined.

The terminal voltage variation times for the respective phases can be estimated by Expressions (18) to (23).

[Math. 18]
$$tUH = \frac{1-vu2*}{2}\frac{Tc}{2} + Ku \cdot td \quad (18)$$

[Math. 19]
$$tUL = \frac{Tc}{2} + \frac{1+vu2*}{2}\frac{Tc}{2} + (1-Ku)td \quad (19)$$

[Math. 20]
$$tVH = \frac{Tc}{2} + \frac{1-vv2*}{2}\frac{Tc}{2} + Kv \cdot td \quad (20)$$

[Math. 21]
$$tVL = \frac{1+vv2*}{2}\frac{Tc}{2} + (1-Kv)td \quad (21)$$

[Math. 22]
$$tWH = \frac{Tc}{2} + \frac{1-vw2*}{2}\frac{Tc}{2} + Kw \cdot td \quad (22)$$

[Math. 23]
$$tWL = \frac{1+vw2*}{2}\frac{Tc}{2} + (1-Kw)td \quad (23)$$

where

[Math. 24]
$$\left(Ku = \begin{cases}1 & iu>0 \\ 0 & iu\leq 0\end{cases}, Kv = \begin{cases}1 & iv>0 \\ 0 & iv\leq 0\end{cases}, Kw = \begin{cases}1 & iw>0 \\ 0 & iw\leq 0\end{cases}\right) \quad (24)$$

Next, operation of the switching signal manipulation unit 152 will be described. In the switching signal manipulation unit 152, at the triangular wave comparison PWM unit 154, switching signals are generated on the basis of triangular wave comparison of the respective phase voltage commands vu*, vv*, and vw* and the respective phase carriers CarrU, CarrV, and CarrW, and switching signals SW_UPtmp, SW_UNtmp, SW_VPtmp, SW_VNtmp, SW_WPtmp, and SW_WNtmp to which a dead time td is added are generated (step S204).

At the synchronization time calculation unit 153, switching signal manipulation times Usft [sec], Vsft [sec], and Wsft [sec] for the respective phases are calculated on the basis of the differences between the terminal voltage variation times for the respective phases.

First, a difference ΔUHVL [sec] between the falling time of the V-phase terminal voltage and the rising time of the U-phase terminal voltage, a difference ΔUHWL [sec] between the falling time of the W-phase terminal voltage and the rising time of the U-phase terminal voltage, a difference ΔULVH [sec] between the rising time of the V-phase terminal voltage and the falling time of the U-phase terminal voltage, and a difference ΔULWH [sec] between the rising time of the V-phase terminal voltage and the falling time of the U-phase terminal voltage are obtained by Expressions (24) to (27), respectively.

$$\Delta UHVL = tUH - tVL \quad (24)$$

$$\Delta UHWL = tUH - tWL \quad (25)$$

$$\Delta ULVH = tUL - tVH \quad (26)$$

$$\Delta ULWH = tUL - tWH \quad (27)$$

Next, the switching signal manipulation times Usft, Vsft, and Wsft for synchronizing rising or falling of the U-phase terminal voltage with either rising or falling of the V-phase and W-phase terminal voltages are calculated separately for conditions (A) to (E) based on the magnitude relation between ΔUHVL [sec], ΔUHWL [sec], ΔHLVH [sec], and ΔULWH [sec] (step S205).

(A) When ΔUHVL<0, ΔUHWL<0, ΔULVH>0, and ΔULWH>0, (a) when ΔUHVL<ΔUHWL, $$Usft = |\Delta UHVL|$$

$$Vsft = 0$$

$$Wsft = \Delta ULWH + |\Delta UHVL|$$

(b) when ΔUHVL≥ΔUHWL, $$Usft = |\Delta UHWL|$$

$$Vsft = \Delta ULVH + |\Delta UHWL|$$

$$Wsft = 0.$$

(B) When ΔUHVL>0, ΔUHWL>0, ΔULVH<0, and ΔULWH<0, (a) when ΔULVH<ΔULWH, $Usft=|\Delta ULVH|$ $Vsft=0$ $Wsft=\Delta UHWL+|\Delta ULVH|$ (b) when ΔULVH≥ΔULWH, $Usft=|\Delta ULWH|$ $Vsft=\Delta UHVL+|\Delta ULWH|$ $Wsft=0.$ (C) When ΔUHVL<0, ΔUHWL>0, ΔULVH>0, and ΔULWH<0, $Usft=0$ $Vsft=\Delta ULVH$ $Wsft=\Delta UHWL.$ (D) When ΔUHVL>0, ΔUHWL<0, ΔULVH<0, and ΔULWH>0, $Usft=0$ $Vsft=\Delta UHVL$ $Wsft=\Delta ULWH.$ (E) At times other than the above, $Usft=0$ $Vsft=0$ $Wsft=0.$ Finally, on the basis of the switching signals SW_UPtmp, SW_UNtmp, SW_VPtmp, SW_VNtmp, SW_WPtmp, and SW_WNtmp for the respective phases outputted by the triangular wave comparison PWM unit 154, the synchronization manipulation unit 155 respectively generates (1) switching signals SW_UP and SW_UN obtained by time-shifting the U-phase switching signals SW_UPtmp and SW_UNtmp by the manipulation time Usft [sec], (2) switching signals SW_VP and SW_VN obtained by time-shifting the V-phase switching signals SW_VPtmp and SW_VNtmp by the manipulation time Vsft [sec], and (3) switching signals SW_WP and SW_WN obtained by time-shifting the W-phase switching signals SW_WPtmp and SW_WNtmp by the manipulation time Wsft [sec] (step S206).

FIGS. 14A and 14B show the terminal voltages and the neutral point potentials of U phase and V phase and of U phase and W phase generated on the basis of the above-described switching signal manipulation.

Figure 11A:
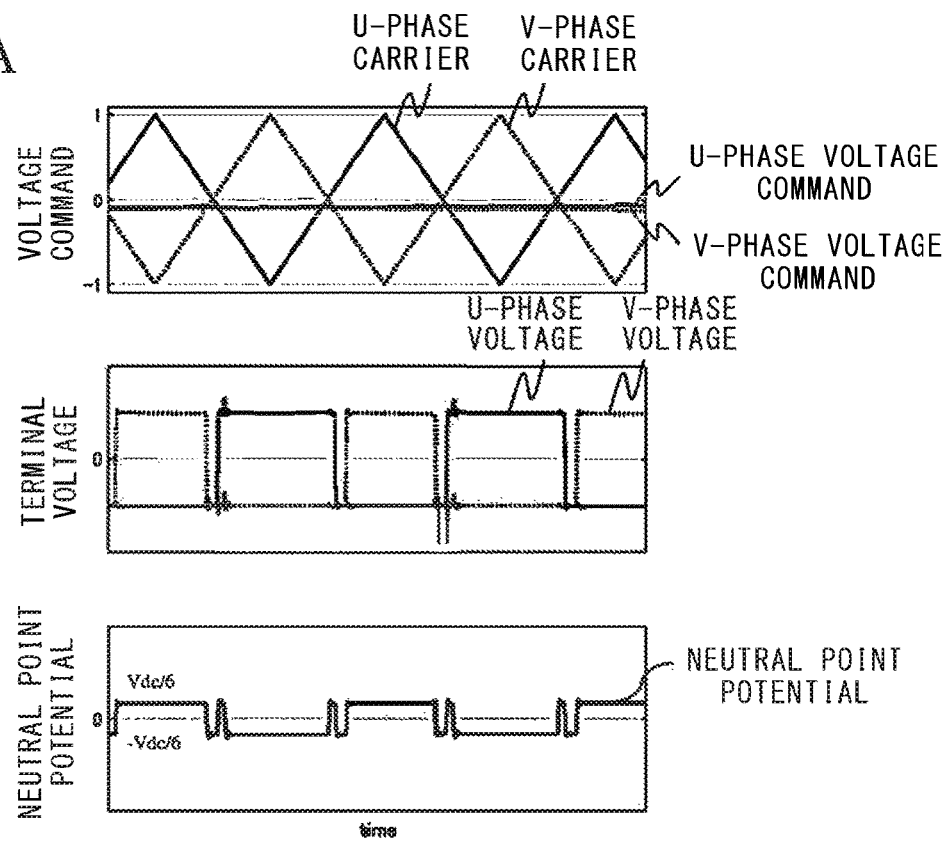
FIG. 11A shows terminal voltages and a neutral point potential of U phase and V phase by a conventional method before switching signal manipulation.
Figure 11B:
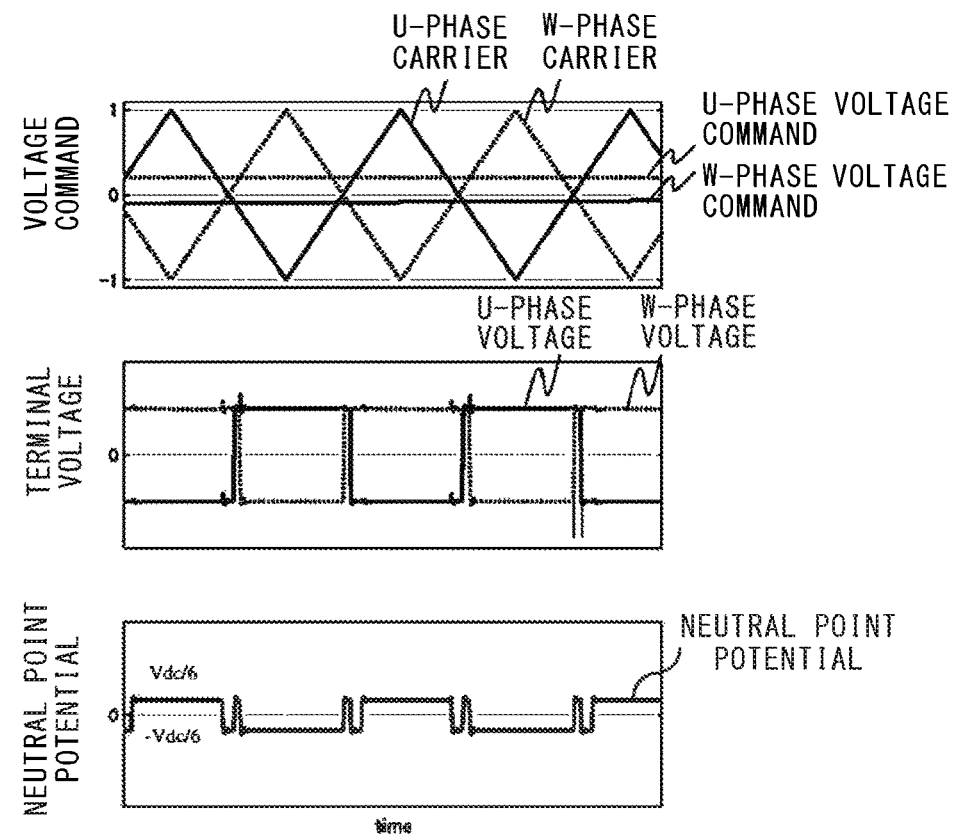
FIG. 11B shows terminal voltages and a neutral point potential of U phase and W phase by the conventional method before switching signal manipulation.

It is confirmed that, as compared to FIGS. 11A and 11B showing the three-phase terminal voltages and the neutral point potentials in the case where switching signals are not manipulated, neutral point potential variation is reduced by synchronizing the U-phase terminal voltage variation with the V-phase and W-phase terminal voltage variation.

In Embodiment 2, the example in which the U-phase terminal voltage variation is synchronized with the V-phase and W-phase terminal voltage variation has been described, but each of V phase and W phase may be set as a reference, and the phase that is set as a reference may be changed in accordance with voltage phase. In addition, each carrier frequency may be variable.

With such a configuration, in the control device which generates switching signals for the upper and lower arms of each phase by triangular wave comparison PWM, regardless of a modulation factor, switching signals capable of synchronizing rising and falling of terminal voltages at least between two phases can be generated under a wide range of driving conditions in which voltage commands are not zero, so that it is possible to reduce neutral point potential variation. Accordingly, it is possible to reduce electromagnetic noise generated with potential variation, so that it is also possible to reduce the size of a noise filter.

Embodiment 3

Although the example in which triangular wave comparison PWM is applied has been described in Embodiment 1 and Embodiment 2, an example in which ON/OFF of upper and lower arm switches is controlled directly using a time on the basis of voltage command values obtained by a voltage command generation unit will be described in Embodiment 3.

The configurations of a power converter 10, a rotating machine 20, and a voltage command generation unit 40 of a control device 30 of Embodiment 3 are the same as those of Embodiment 1.

Figure 15:
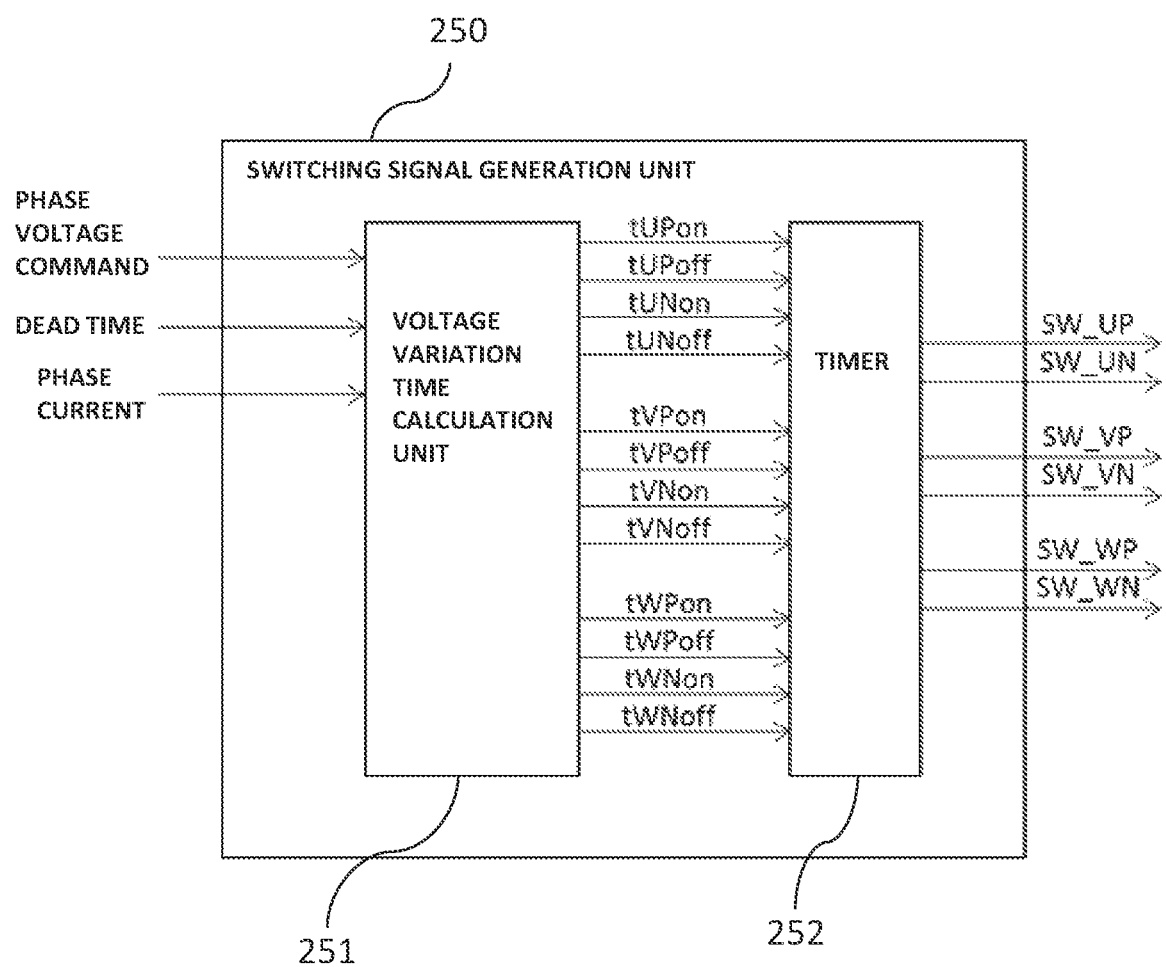
FIG. 15 is a function block diagram of a switching signal generation unit of Embodiment 3.
Figure 16:
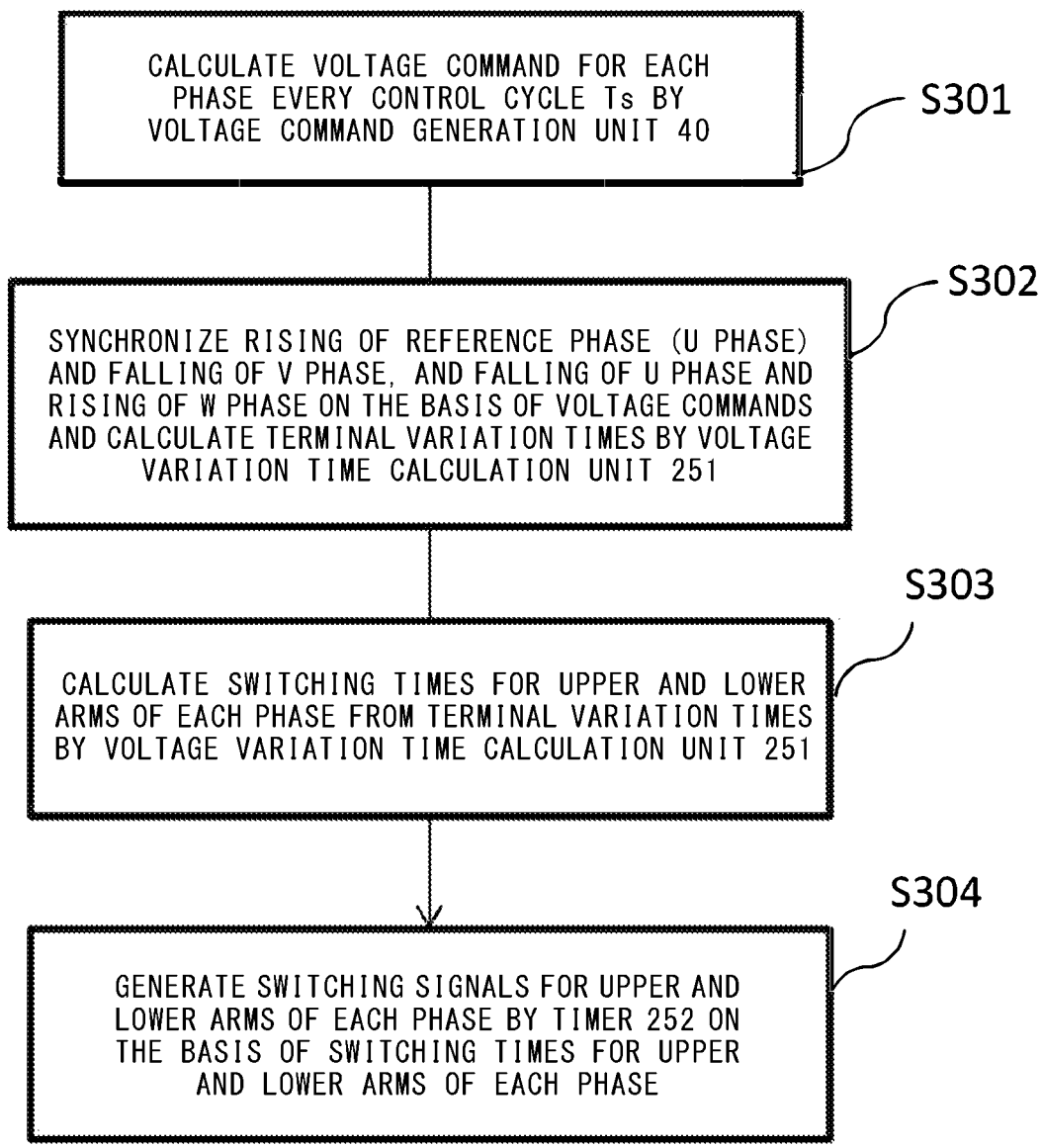
FIG. 16 is a flowchart showing operation of the switching signal generation unit of Embodiment 3.

FIG. 15 shows a function block diagram of a switching signal generation unit 250 in Embodiment 3. Operation of the switching signal generation unit 250 will be sequentially described with reference to a flowchart of FIG. 16.

The switching signal generation unit 250 includes a voltage variation time calculation unit 251 and a timer 252. The voltage command generation unit 40 generates a voltage command for each phase every control cycle Ts (step S301 in FIG. 16).

At a predetermined time (for example, time T1 in FIG. 17), calculation of each phase voltage command is started, and the calculated voltage commands are reflected in the next control cycle. Here, phase voltage commands normalized by Vdc/2 in the present control cycle are defined as vu1*, vv1*, and vw1*, respectively, and phase voltage commands normalized by Vdc/2 in the next control cycle are defined as vu2*, vv2*, and vw2*, respectively.

As a detected current, the average of values detected a plurality of times by the current detector in a control cycle is used, and the detected current is updated every switching cycle (Ts).

At the voltage variation time calculation unit 251, switching times for the upper and lower arms of each phase in the next control cycle are calculated every switching cycle (Ts [sec]) on the basis of the voltage commands vu2*, vv2*, and vw2* with which update is performed in the next cycle, detected currents iu [A], iv [A], and iw [A], and a dead time td [sec]. The calculation of the switching times is completed immediately before the switching cycle Ts [sec].

In accordance with each phase voltage command and the polarity of each detected current, ON and OFF times for the upper and lower arm switches are calculated on the basis of the next cycle time T2=0 in the following manner. Each switching time is manipulated between 0 and 2 Ts.

Figure 17:
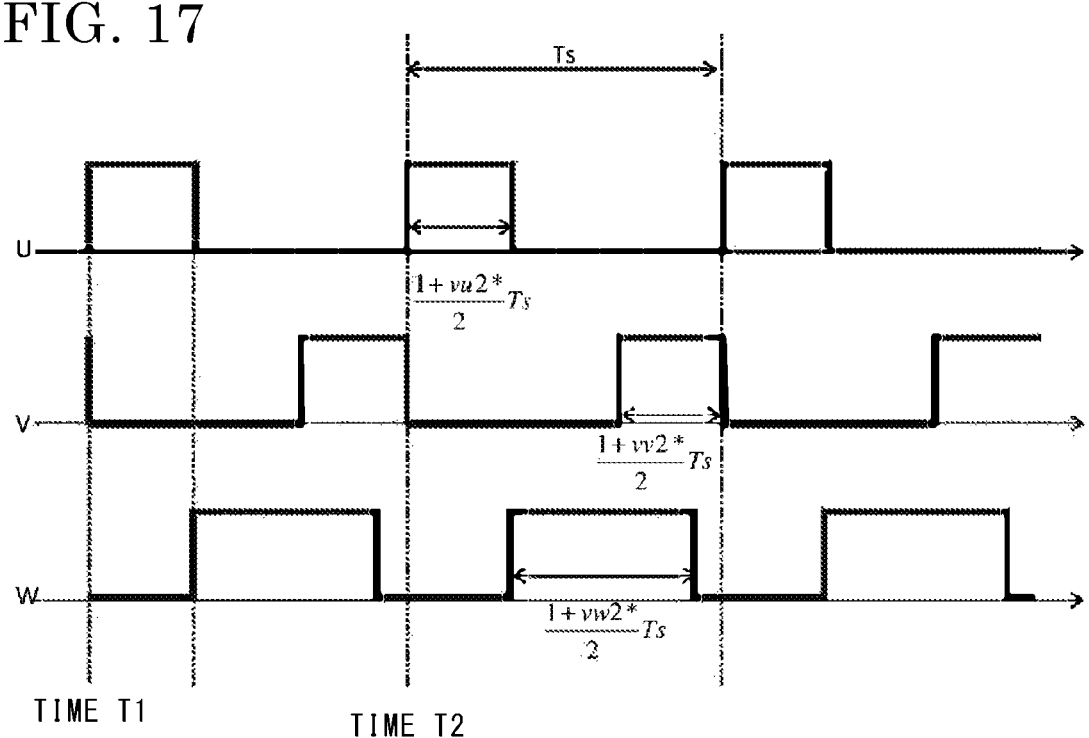
FIG. 17 shows an example of each phase terminal voltage in Embodiment 3.

An example in which rising of a U-phase terminal voltage is synchronized with falling of a V-phase terminal voltage, and falling of the U-phase terminal voltage is synchronized with rising of a W-phase terminal voltage as shown in FIG. 17, will be described. Switching signals and terminal voltage variation times tUPon [sec], tUPoff [sec]. tUNon [sec], and tUNoff [sec] for U phase that is set as a reference phase are calculated (step S302), and then switching times tVPon [sec], tVPoff [sec], tVNon [sec], and tVNoff [sec] for V phase and switching times tWPon [sec], tWPoff [sec], tWNon [sec], and tWNoff [sec] for W phase are calculated (step S303).

The dead time td is provided to prevent the upper-side switch and the lower-side switch from being turned on at the same time.

In consideration of the dead time, ON times and OFF times for the upper and lower arm switches are calculated.

The ON and OFF times for the upper and lower arm switches are calculated separately for cases based on the current polarity of each phase.

(A) When iu>0

The ON and OFF times tUPon [sec], tUPoff [sec], tUNon [sec], and tUNoff [sec] for the upper and lower arm switches of U phase are determined by the following expressions.

When iu>0, a rising time of the terminal voltage of the upper arm switch of U phase is tUPon [sec], a falling time thereof is tUPoff [sec], a rising time of the terminal voltage of the lower arm switch of U phase is tUNon [sec], and a falling time thereof is tUNoff [sec].

$$tUNoff=0+td$$

$$tUPon=0+td+td$$

$$tUPoff=td+(1+vu2^*)Ts/2$$

$$tUNon=td+(1+vu2^*)Ts/2+td$$

(a) When iv>0

The ON and OFF times tVPon [sec], tVPoff [sec], tVNon [sec], and tVNoff [sec] for the upper and lower arm switches of V phase are determined by the following expressions.

A rising time of the terminal voltage of V phase is tVPon [sec], and a falling time thereof is tVPoff [sec].

Switching timings are determined such that tUPon [sec] and tVPoff [sec] are equal to each other.

$$tVPoff=td+td$$

$$tVNon=td+td+td$$

$$tVNoff=td+td+((1-vv2^*)Ts/2)$$

$$tVPon=td+td+((1-vv2^*)Ts/2)+td$$

(b) When iv<0

The ON and OFF times tVPon [sec], tVPoff [sec], tVNon [sec], and tVNoff [sec] for the upper and lower arm switches of V phase are determined by the following expressions.

A rising time of the terminal voltage of V phase is tVNoff [sec], and a falling time thereof is tVNon [sec].

Switching timings are determined such that tUPon [sec] and tVNon [sec] are equal to each other.

$$tVPoff=0+td$$

$$tVNon=td+td$$

$$tVNoff=td+((1-vv2^*)Ts/2)$$

$$tVPon=td+((1-vv2^*)Ts/2)+td$$

(c) When iw>0

The ON and OFF times tWPon [sec], tWPoff [sec], tWNon [sec], and tWNoff [sec] for the upper and lower arm switches of W phase are determined by the following expressions.

A rising time of the terminal voltage of W phase is tWPon [sec], and a falling time thereof is tWPoff [sec].

Switching timings are determined such that tUPoff [sec] and tWPon [sec] are equal to each other.

$$tWNoff=(1+vu2^*)Ts/2$$

$$tWPon=td+(1+vu2^*)Ts/2$$

$$tWPoff=(1+vu2^*)Ts/2+((1-vw2^*)Ts/2)$$

$$tWNon=(1+vu2^*)Ts/2+((1-vw2^*)Ts/2)+td$$

(d) When iw<0

The ON and OFF times tWPon [sec], tWPoff [sec], tWNon [sec], and tWNoff [sec] for the upper and lower arm switches of W phase are determined by the following expressions.

A rising time of the terminal voltage of W phase is tWNoff [sec], and a falling time thereof is tWNon [sec].

Switching timings are determined such that tUPoff [sec] and tWNoff [sec] are equal to each other.

$$tWNoff=td+(1+vu2^*)Ts/2$$

$$tWPon=td+(1+vu2^*)Ts/2+td$$

$$tWPoff=td+(1+vu2^*)Ts/2+(1-vw2^*)Ts/2$$

$$tWNon=td+(1+vu2^*)Ts/2+(1-vw2^*)Ts/2+$$

(B) When iu<0

The ON and OFF times tUPon [sec], tUPoff [sec], tUNon [sec], and tUNoff [sec] for the upper and lower arm switches of U phase are determined by the following expressions.

When iu<0, a rising time of the terminal voltage of U phase is tUNoff [sec], and a falling time thereof is tUNon [sec].

$$tUNoff=0+td$$

$$tUPon=0+td+td$$

$$tUPoff=td+(1+vu2^*)Ts/2$$

$$tUNon=td+(1+vu2^*)Ts/2+td$$

(a) When iv>0

The ON and OFF times tVPon [sec], tVPoff [sec], tVNon [sec], and tVNoff [sec] for the upper and lower arm switches of V phase are determined by the following expressions.

A rising time of the terminal voltage of V phase is tVPon [sec], and a falling time thereof is tVPoff [sec].

Switching timings are determined such that tUNoff [sec] and tVPoff [sec] are equal to each other.

$$tVPoff=0+td$$

$$tVNon=td+td$$

$$tVNoff=td+(1-vv2^*)Ts/2$$

$$tVPon=td+(1-vv2^*)Ts/2+td$$

(b) When iv<0

The ON and OFF times tVPon [sec], tVPoff [sec], tVNon [sec], and tVNoff [sec] for the upper and lower arm switches of V phase are determined by the following expressions.

A rising time of the terminal voltage of V phase is tVNoff [sec], and a falling time thereof is tVNon [sec].

Switching timings are determined such that tUNoff [sec] and tVNon [sec] are equal to each other.

$$tVPoff=0$$

$$tVNon=0+td$$

$$tVNoff=(1-vv2^*)Ts/2$$

$$tVPon=(1-vv2^*)Ts/2+td$$

(c) When iw>0

The ON and OFF times tWPon [sec], tWPoff [sec], tWNon [sec], and tWNoff [sec] for the upper and lower arm switches of W phase are determined by the following expressions.

A rising time of the terminal voltage of W phase is tWPon [sec], and a falling time thereof is tWPoff [sec].

Switching timings are determined such that tUNon [sec] and tWPon [sec] are equal to each other.

$$tWNoff=td+(1+vu2^*)Ts/2$$

$$tWPon=td+(1+vu2^*)Ts/2+td$$

$$tWPoff=td+(1+vu2^*)Ts/2+(1-vw2^*)Ts/2$$

$$tWNon=td+(1+vu2^*)Ts/2+(1-vw2^*)Ts/2+$$

(d) When iw<0

The ON and OFF times tWPon [sec], tWPoff [sec], tWNon [sec], and tWNoff [sec] for the upper and lower arm switches of W phase are determined by the following expressions.

A rising time of the terminal voltage of W phase is tWNoff [sec], and a falling time thereof is tWNon [sec].

Switching timings are determined such that tUNon [sec] and tWNoff [sec] are equal to each other.

$$tWNoff=td+(1+vu2^*)Ts/2+td$$

$$tWPon=td+(1+vu2^*)Ts/2+td+td$$

$$tWPoff=td+(1+vu2^*)Ts/2+td+(1-vw2^*)Ts/2$$

$$tWNon=td+(1+vu2^*)Ts/2+td+(1-vw2^*)Ts/2+td$$

Next, the timer 252 generates switching signals for the upper and lower arms of each phase on the basis of the switching times for the upper and lower arms of each phase that are calculated by the voltage variation time calculation unit 251.

The timer 252 adjusts the ON and OFF times for the upper and lower arm switches of each phase and generates switching signals (step S304). ON/OFF of the switches of each phase is controlled on the basis of the switching signals generated by the timer 252.

Although the example in which, as each of the above switching times for the upper and lower arms, a switching time for each phase is calculated in consideration of the dead time td, has been described, it is also necessary to take into consideration a time taken from input of a switching signal for ON until the switching element is actually turned on or a time taken from input of a switching signal for OFF until the switching element is actually turned off.

Figure 18:
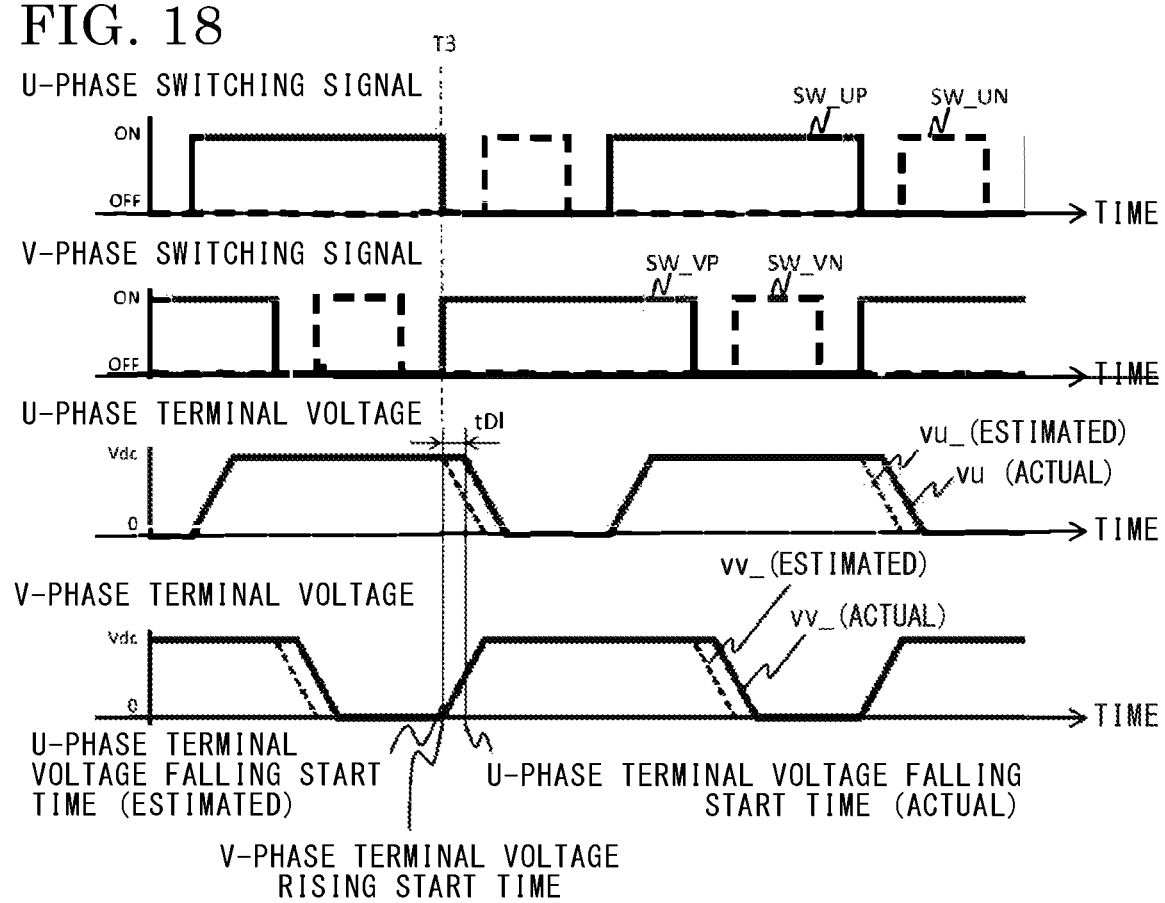
FIG. 18 is a diagram for explaining delays of ON times and OFF times of terminal voltages according to Embodiment 3.

Specifically, for example, as shown in FIG. 18, even when a U-phase switching signal for OFF is inputted to the switching element at time T3, the U-phase terminal voltage does not fall at a U-phase terminal voltage falling start time (estimated), and starts falling at a U-phase terminal voltage falling start time (actual) after a time difference tD1. Therefore, when calculating a rising time and a falling time of each phase terminal voltage, it is effective to add or subtract such a time difference tD1 and synchronize the falling time and the rising time of each phase terminal voltage. This is effective not only in Embodiment 3 but also in Embodiment 1 and Embodiment 2.

Moreover, in the present embodiment, the method, in which ON and OFF times for the upper and lower arm switches of each phase are calculated on the basis of the rising time and the falling time of the terminal voltage of U phase as a phase to be cancelled, has been described, but rising and falling of the terminal voltage of one phase (for example, U phase) to be cancelled may be detected and used for generating switching signals for the other phases.

Specifically, when rising of the terminal voltage of U phase has been detected, for example, the upper arm switch of V phase (preferably, a phase having a positive phase current) is turned off, and the lower arm switch of V phase is turned on after the dead time td [sec] with the time of detection of rising of the terminal voltage of U phase as a reference (0 [sec]). On the basis of the voltage command, the lower arm switch of V phase is turned off after (1−vv1*) Ts/2, and the upper arm switch of V phase is turned on after ((1−vv1*)Ts/2+td).

When falling of the terminal voltage of U phase has been detected, for example, the lower arm switch of W phase (preferably, a phase having a negative phase current) is turned off, and the upper arm switch of W phase is turned on after the dead time td [sec] with the time of detection of falling of the terminal voltage of U phase as a reference (0 [sec]). On the basis of the voltage command, the upper arm switch of W phase is turned off after (1+vw1*)Ts/2, and the upper arm switch of V phase is turned on after ((1+vw1*) Ts/2+td).

Accordingly, by detecting rising and falling of the terminal voltage of the phase to be cancelled, it is possible to synchronize rising and falling of terminal voltages at least between one pair of two phases without necessarily calculating rising and falling of the terminal voltages.

In such a configuration of Embodiment 3, since the control device which generates switching signals for the upper and lower arms of each phase is configured to include the voltage variation time calculation unit 251 and the timer 252, switching signals capable of synchronizing rising and falling of terminal voltages at least between two phases can be generated under a wide range of driving conditions in which voltage commands are not zero, regardless of a modulation factor, with a simple configuration not using triangular wave comparison PWM. Accordingly, it is possible to reduce neutral point potential variation, and electromagnetic noise generated with potential variation can be reduced. In addition, it is also possible to reduce the size of a noise filter.

Figure 19:
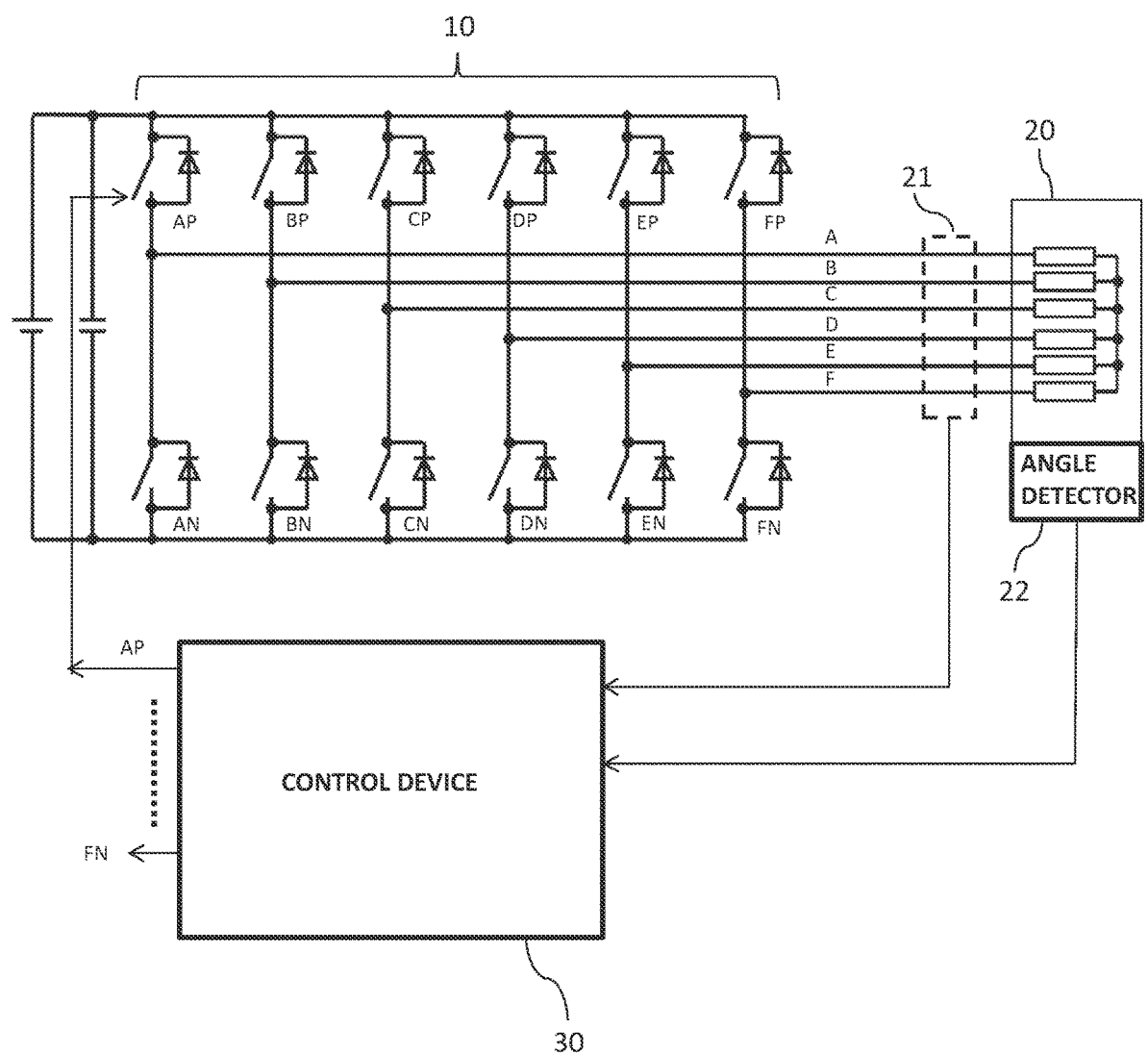
FIG. 19 shows the configuration of a six-phase inverter to which Embodiments 1 to 3 are applied.

In Embodiments 1 to 3, the example of the configuration of the three-phase inverter as the power converter 10 has been described. However, by using a configuration such as a six-phase inverter as the power converter 10 as shown in FIG. 19 and controlling the control device 30 in the same manner as described in Embodiments 1 to 3, rising and falling of terminal voltages between two phases may be synchronized based on A phase.

Figure 20:
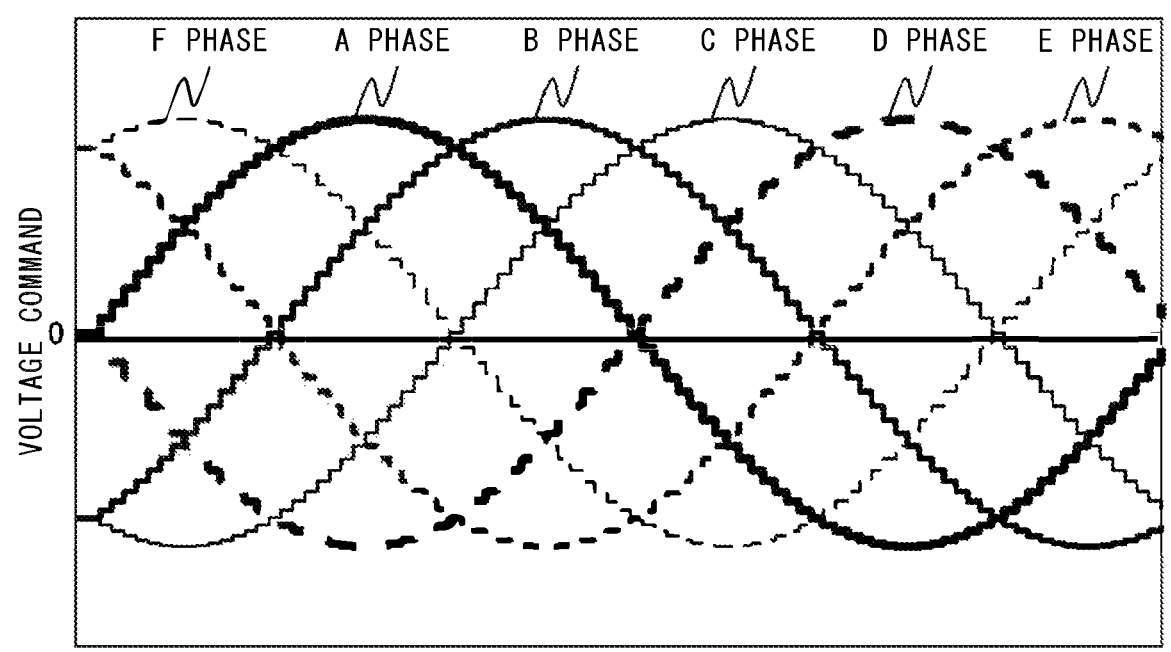
FIG. 20 is a diagram for explaining phase voltage commands for six phases to which Embodiments 1 to 3 are applied.
Figure 21A:
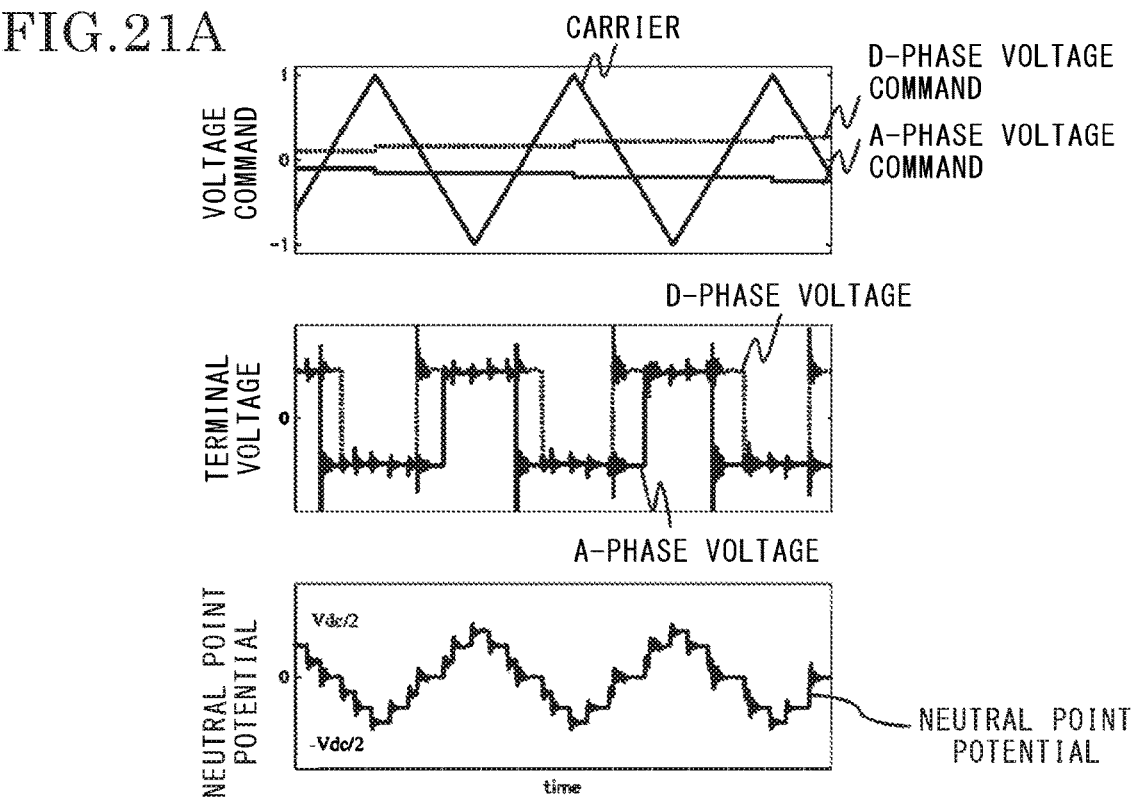
FIG. 21A shows conventional terminal voltages and neutral point potential for comparison with Embodiment 3.
Figure 21B:
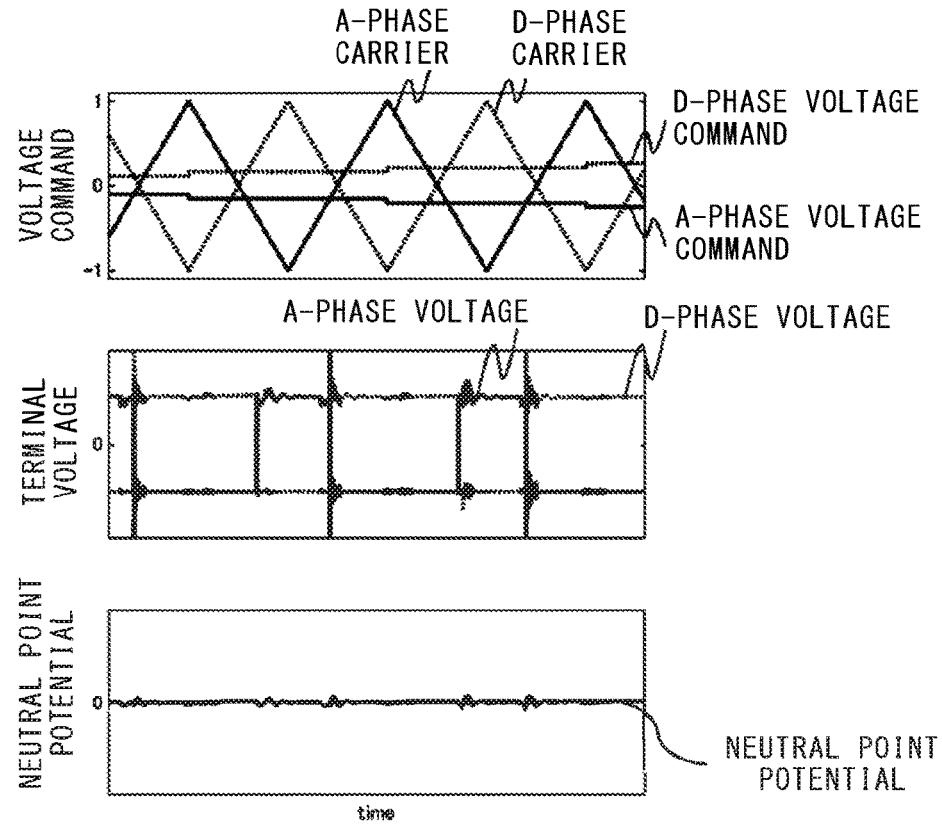
FIG. 21B shows an example of terminal voltages and neutral point potential to which Embodiment 3 is applied.

For example, in the case of switching the power converter and driving the rotating machine on the basis of phase voltage commands, for six phases, with phases different from each other by 60 degrees as shown in FIG. 20 by the control in Embodiment 3, the effect of reducing neutral point potential variation is obtained as shown in FIG. 21B, as compared to a conventional method shown in FIG. 21A, by setting the phase difference between carriers for two phases (for example, A phase and D phase in FIG. 20) for which the phases of the phase voltage commands are different from each other by 180 degrees to 180 degrees.

Figure 22:
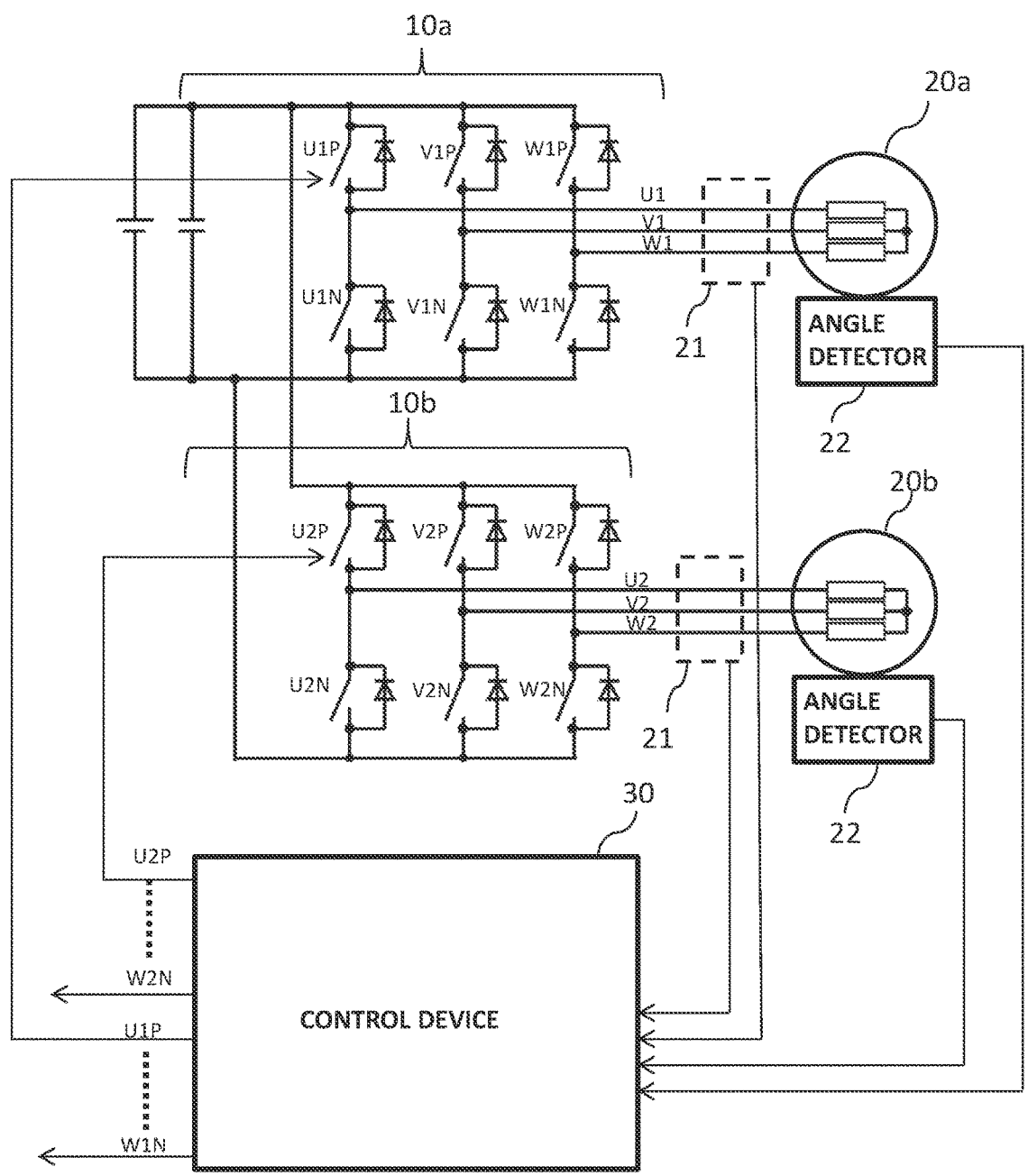
FIG. 22 shows a configuration to which Embodiments 1 to 3 are applied and in which two rotating machines are driven by two three-phase inverters.

Moreover, in Embodiments 1 to 3, the example in which the one three-phase rotating machine 20 is driven by the three-phase inverter as the power converter 10 has been described. However, a drive system that drives three-phase rotating machines 20a and 20b with two three-phase inverters 10a and 10b as shown in FIG. 22 may perform control in which not only rising and falling of terminal voltages between two phases in the same inverter 10a but also rising and falling of terminal voltages between two phases in the inverter 10a and the inverter 10b are synchronized by controlling the control device 30 in the same manner as described in Embodiments 1 to 3.

Figure 23:
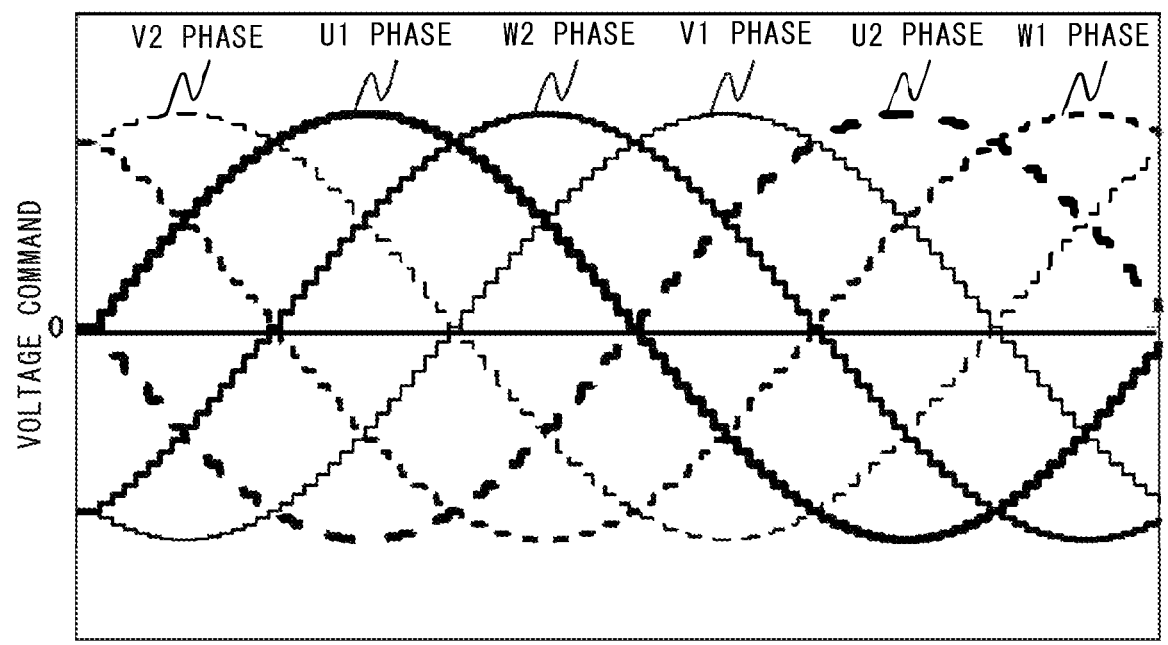
FIG. 23 is a diagram for explaining each of phase voltage commands of the two three-phase inverters to which Embodiments 1 to 3 are applied.

Furthermore, for example, in the case of switching the power converters and driving the rotating machines on the basis of phase voltage commands, for six phases U1, V1, W1, U2, V2, and W2, with phases different from each other by 60 degrees as shown in FIG. 23 by the control in Embodiment 2, the effect of reducing neutral point potential variation is obtained, similar to that shown in FIG. 21B, by setting the phase difference between carriers for two phases (for example, U1 phase and U2 phase in FIG. 23) for which the phases of the phase voltage commands are different from each other by 180 degrees to 180 degrees.

Although the present disclosure is described above in terms of various exemplary embodiments and examples, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10 power converter
11 DC power supply
12 smoothing capacitor
13 switching element
20 rotating machine
21 current detector
22 angle detector
30 control device
40 voltage command generation unit
50, 150, 250 switching signal generation unit
51, 151 voltage variation time estimation unit
52, 152 switching signal manipulation unit
53 carrier generation unit
54, 154 triangular wave comparison PWM unit
153 synchronization time calculation unit
155 synchronization manipulation unit
251 voltage variation time calculation unit
252 timer

The invention claimed is:

1. A power conversion device comprising: a power converter in which a plurality of one-phase legs each including an upper arm switching element and a lower arm switching element are connected in parallel to a DC power supply and connection points between the upper arm switching elements and the lower arm switching elements are connected to a load; and a control device for controlling switching operation of the upper arm switching elements and the lower arm switching elements of the power converter, the power conversion device converting DC power to AC power and supplying the AC power to the load, wherein
the control device includes a voltage variation time estimater which performs switching control such that, on the basis of a terminal variation time which is calculated at least one of, the rising time of the terminal voltage of the first one-phase leg and a falling time of a terminal voltage of a second one-phase leg, and/or the falling time of the terminal voltage of the first one-phase leg and a rising time of the terminal voltage of the second one-phase leg, are synchronized with each other
and reducing electro magnetic noise under a wide range of driving conditions in which voltage commands are not zero,
wherein the voltage variation time estimater calculates a rising time and a falling time of the terminal voltage of the connection point, connected to the load, of the first one-phase leg among the plurality of one-phase legs,
a carrier generator synchronizes the rising time of the terminal voltage of the first one-phase leg calculated by the voltage variation time estimater and the falling time of the terminal voltage of the second one-phase leg, or the falling time of the terminal voltage of the first one-phase leg calculated by the voltage variation time estimater and the rising time of the terminal voltage of the second one-phase leg with each other, calculates carrier frequencies for a plurality of phases, and generates the carriers for the respective phases, and
a triangular wave comparison PWM controller generates switching signals on the basis of the carriers for the respective phases generated by the carrier generator and voltage commands for the respective phases.

2. The power conversion device according to claim 1, wherein a carrier frequency for the first one-phase leg is fixed.

3. The power conversion device according to claim 1, wherein the control device includes:
a voltage variation time estimater for calculating a rising time and a falling time of a terminal voltage of each of the connection points, connected to the load, of the plurality of one-phase legs;
a synchronization time calculator for calculating a switching signal manipulation time for synchronizing the rising time or the falling time for each phase calculated by the voltage variation time estimater;
a triangular wave comparison PWM controller for generating switching signals on the basis of carriers for respective phases and voltage commands for the respective phases; and
a synchronization manipulator for controlling the switching signal on the basis of the switching signal manipulation time.

4. The power conversion device according to claim 3, wherein carrier frequencies of the carriers for the respective phases are fixed.

5. The power conversion device according to claim 3, wherein, among the carriers for the respective phases, at least one carrier is inverted with respect to another carrier.

6. The power conversion device according to claim 1, wherein the load includes m rotating machines each including windings of n phases, where m is an integer equal to or greater than 1 and n is an integer equal to or greater than 2, and among the carriers for the respective phases, a first carrier is inverted with respect to a second carrier, and a phase of a voltage command for a phase of the first carrier is different from a phase of a voltage command for a phase of the second carrier by 180 degrees.

7. The power conversion device according to claim 1, wherein on the basis of a difference between a switching time of the switching signal for turning on the upper arm switching element of the one-phase leg and a time at which the upper arm switching element of the one-phase leg is turned on, the voltage variation time estimater corrects a rising time of a terminal voltage of the connection point, connected to the load, of the one-phase leg, or on the basis of a difference between a switching time of the switching signal for turning on the lower arm switching element of the one-phase leg and a time at which the lower arm switching element of the one-phase leg is turned on, the voltage variation time estimater corrects a falling time of the terminal voltage of the connection point, connected to the load, of the one-phase leg.

8. A power conversion device comprising: a power converter in which a plurality of one-phase legs each including an upper arm switching element and a lower arm switching element are connected in parallel to a DC power supply and connection points between the upper arm switching elements and the lower arm switching elements are connected to a load; and a control device for controlling switching operation of the upper arm switching elements and the lower arm switching elements of the power converter, the power conversion device converting DC power to AC power and supplying the AC power to the load, wherein the control device includes:

a voltage variation time calculator for calculating a rising time and a falling time of the terminal voltage of the connection point, connected to the load, of the first one-phase leg among the plurality of one-phase legs, calculating a terminal voltage variation time for synchronizing the calculated rising time of the terminal voltage of the first one-phase leg and the falling time of the terminal voltage of the second one-phase leg, or the calculated falling time of the terminal voltage of the first one-phase leg and the rising time of the terminal voltage of the second one-phase leg with each other, and calculating switching times for the upper arm switching element and the lower arm switching element from a voltage command for each phase and the terminal voltage variation time; and a timer for generating switching signals on the basis of the switching times for the upper arm switching element and the lower arm switching element, and the control device performs switching control such that, on the basis of a rising time and a falling time of a terminal voltage of a connection point, connected to the load, of a first one-phase leg, at least the rising time of the terminal voltage of the first one-phase leg and a falling time of a terminal voltage of a second one-phase leg or the falling time of the terminal voltage of the first one-phase leg and a rising time of the terminal voltage of the second one-phase leg are synchronized with each other.

9. The power conversion device according to claim 8, wherein on the basis of a difference between a switching time of the switching signal for turning on the upper arm switching element of the one-phase leg and a time at which the upper arm switching element of the one-phase leg is turned on, the voltage variation time calculator corrects a rising time of a terminal voltage of the connection point, connected to the load, of the one-phase leg, or on the basis of a difference between a switching time of the switching signal for turning on the lower arm switching element of the one-phase leg and a time at which the lower arm switching element of the one-phase leg is turned on, the voltage variation time calculator corrects a falling time of the terminal voltage of the connection point, connected to the load, of the one-phase leg.

10. A rotating machine drive system comprising:

the power conversion device according to claim 1, and a load including m rotating machines each including windings of n phases, where m is an integer equal to or greater than 1 and n is an integer equal to or greater than 2.

11. The power conversion device according to claim 1, wherein the terminal variation time is recalculated on each cycle of a carrier wave.

12. The power conversion device according to claim 1, wherein the control device performs the switching control based on triangular wave comparison between different carriers for each of the plurality of phases.

13. The power conversion device according to claim 1, wherein the terminal variation time is a duration based on a carrier for the first one-phase leg and a voltage command for the first one-phase leg.

14. The power conversion device according to claim 1, wherein the control device calculates the terminal variation time based on a voltage command of the first one-phase leg, a carrier cycle time of the first one-phase leg, and a dead time that is a delay added before a switching element is turned on.

* * * * *